(12) United States Patent
Kobayashi et al.

(10) Patent No.: US 11,215,510 B2
(45) Date of Patent: Jan. 4, 2022

(54) THERMAL INFRARED DETECTOR AND MANUFACTURING METHOD FOR THERMAL INFRARED DETECTOR

(71) Applicant: Mitsubishi Electric Corporation, Tokyo (JP)

(72) Inventors: Satoi Kobayashi, Tokyo (JP); Takaki Sugino, Tokyo (JP); Takafumi Hara, Tokyo (JP); Yuji Kawano, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 10 days.

(21) Appl. No.: 15/345,946

(22) Filed: Nov. 8, 2016

(65) Prior Publication Data

US 2017/0328778 A1    Nov. 16, 2017

(30) Foreign Application Priority Data

May 13, 2016   (JP) .............................. JP2016-096880

(51) Int. Cl.
*G01J 5/58*     (2006.01)
*G01J 5/10*     (2006.01)
(Continued)

(52) U.S. Cl.
CPC ................ *G01J 5/10* (2013.01); *G01J 5/024* (2013.01); *G01J 5/06* (2013.01); *G01J 5/0825* (2013.01);
(Continued)

(58) Field of Classification Search
CPC .... G01J 5/10; G01J 5/20; G01J 5/0853; G01J 5/0825; G01J 5/024; G01J 5/06; G01J 2005/065
See application file for complete search history.

(56) References Cited

U.S. PATENT DOCUMENTS 5,397,897 A * 3/1995 Komatsu ................. G01J 5/045
250/338.4
5,929,440 A * 7/1999 Fisher ....................... G01J 5/40
250/332
(Continued)

FOREIGN PATENT DOCUMENTS

JP   2004093535 A    3/2004
JP   2004-325379 A   11/2004
(Continued)

OTHER PUBLICATIONS

Kleiner et al., Thermal conductivity measurements of thin dioxide films in integrated circuits, IEEE Transactions on Electron Devices, vol. 43, No. 9 (Sep. 1996), pp. 1602-1609.*
(Continued)

*Primary Examiner* — David P Porta
*Assistant Examiner* — Shun Lee
(74) *Attorney, Agent, or Firm* — Sughrue Mion, PLLC; Richard C. Turner

(57) ABSTRACT

In a thermal infrared detector having trench structures, at least one sensor element is provided between the trench structures, an etching hole through which the sensor element is hollowed out and thereby thermally insulated is provided in a substrate rear surface or on the periphery of a pixel area, and an opening portion is provided below the pixel area.

18 Claims, 19 Drawing Sheets

(51) Int. Cl.
*G01J 5/06* (2006.01)
*G01J 5/08* (2006.01)
*G01J 5/20* (2006.01)
*G01J 5/02* (2006.01)

(52) U.S. Cl.
CPC .............. *G01J 5/0853* (2013.01); *G01J 5/20* (2013.01); *G01J 2005/065* (2013.01)

(56) References Cited

U.S. PATENT DOCUMENTS

| | | | |
|---|---|---|---|
| 5,962,854 A * | 10/1999 | Endo | G01J 5/02 250/338.1 |
| 6,031,231 A * | 2/2000 | Kimata | G01J 5/08 250/332 |
| 6,552,344 B1 | 4/2003 | Sone et al. | |
| 2004/0200962 A1 * | 10/2004 | Ishikawa | G01J 5/02 250/339.04 |
| 2005/0178967 A1 * | 8/2005 | Nakaki | G01J 5/024 250/339.04 |
| 2008/0217539 A1 * | 9/2008 | Talghader | A61B 17/3478 250/340 |
| 2014/0054462 A1 * | 2/2014 | Samarao | G01J 5/0853 250/338.4 |
| 2015/0179864 A1 * | 6/2015 | Huminic | G01J 5/0225 438/54 |
| 2015/0362374 A1 * | 12/2015 | Wheeler | G01J 5/20 250/332 |
| 2016/0173834 A1 * | 6/2016 | Bert | H04N 5/335 348/222.1 |

FOREIGN PATENT DOCUMENTS

| | | |
|---|---|---|
| JP | 3944465 B | 7/2007 |
| JP | 4224949 B | 2/2009 |
| JP | 4964935 B2 | 7/2012 |
| JP | 2013044590 A | 3/2013 |
| JP | 2014-199254 A | 10/2014 |
| JP | 2015118078 A | 6/2015 |

OTHER PUBLICATIONS

Uma et al., Temperature-dependent thermal conductivity of undoped polycrystalline silicon layers, International Journal of Thermophysics, vol. 22, No. 2 (Mar. 2001), pp. 605-616.*
Communication dated Apr. 4, 2017, from the Japanese Patent Office in counterpart application No. 2016-096880.
Office Action dated Dec. 23, 2020 in German Application No. 102016224977.0.

* cited by examiner

THERMAL INFRARED DETECTOR AND MANUFACTURING METHOD FOR THERMAL INFRARED DETECTOR

BACKGROUND OF THE INVENTION

1. Field of the Invention

This invention relates to a thermal infrared detector that converts heat generated by infrared ray absorption into electricity and detects the electricity, and more particularly to a highly sensitive thermal infrared detector having a small thermal time constant, and a manufacturing method for manufacturing the thermal infrared detector with stability.

2. Description of the Related Art

Infrared detectors using infrared rays can be broadly divided according to operating principle into thermal infrared detectors that utilize temperature variation occurring when energy from the infrared rays is absorbed, and quantum infrared detectors that utilize carrier excitation resulting from absorption of the infrared rays.

A quantum infrared detector operates at a low temperature, and therefore an element used thereby must be cooled to approximately −200° C. using a refrigerator. As a result, drawbacks such as structural complexity, the need for refrigerator maintenance, increased cost, and handling difficulty arise.

A thermal infrared detector, on the other hand, does not require a cooling device, and therefore has a simple structure and a low cost. Accordingly, thermal infrared detectors are used widely for general purposes.

The main performance indicators of a thermal infrared detector are sensitivity and a thermal time constant. To improve the sensitivity, it is important to increase an aperture and a thermal resistance of a sensor element. To increase the aperture, the proportion of an infrared ray absorption portion relative to a pixel area is increased so that the sensor element can absorb a larger quantity of infrared rays (see Japanese Patent No. 4224949, for example).

To increase the thermal resistance, meanwhile, a heat insulating structure is provided to ensure that heat generated by the sensor element during infrared ray absorption does not escape to the periphery of the sensor element. A heat insulating structure is realized by, for example, providing a narrow, thin-film heat insulation support leg on the sensor element (see Japanese Patent No. 3944465, for example) or etching the underside of the sensor element so that the sensor element is hollowed out and thereby thermally insulated (see Japanese Patent Application Publication No. 2014-199254, for example).

To reduce the thermal time constant, or in other words to improve a response speed, it is important to reduce a thermal capacity of the sensor element and avoid thermal saturation on the periphery of the sensor element. The thermal capacity of the sensor element is reduced by reducing the thickness and volume of the sensor element. Thermal saturation on the periphery of the sensor element is avoided by employing a substrate as a heat sink.

SUMMARY OF THE INVENTION

However, the prior art includes the following problems.

In consideration of the circumstances described above, the prior art described in Japanese Patent No. 4224949 improves the sensitivity of a thermal infrared detector by providing an infrared ray absorption structure on an upper portion of the sensor element in order to increase the aperture thereof. With a structure such as that described in Japanese Patent No. 4224949, however, an etching hole through which the sensor element is hollowed out and thereby thermally insulated must be provided in the infrared ray absorption structure. As a result, the aperture decreases.

Further, to increase a pixel count and reduce a pixel pitch, Japanese Patent No. 4224949 is structured such that the sensor element and the heat insulation support leg are provided on an identical plane. Therefore, in Japanese Patent No. 4224949, when a wire of the heat insulation support leg is lengthened in order to increase the thermal resistance while reducing the pixel pitch, a surface area of the sensor element decreases. As a result, a sensor characteristic deteriorates dramatically, making it difficult to improve the sensitivity even by providing an infrared ray absorption structure in order to increase the aperture.

In response to this problem, the sensor element and the heat insulation support leg on separate planes in Japanese Patent No. 3944465 so that the thermal resistance is increased while securing a sufficient size for the sensor element. In Japanese Patent No. 3944465, however, the aperture of the sensor element decreases due to light blockage by the heat insulation support leg provided on the sensor element. To increase the aperture in Japanese Patent No. 3944465, therefore, the infrared ray absorption structure must be formed on the sensor element.

In the structure described in Japanese Patent Application Publication No. 2014-199254, a first opening portion formed by stopping etching midway through a substrate is provided with the aim of improving the aperture. Further, in the structure described in Japanese Patent Application Publication No. 2014-199254, a second opening portion that penetrates to the sensor element is provided between a circuit area and a pixel area within the first opening portion.

With this structure, the sensor element of Japanese Patent Application Publication No. 2014-199254 can absorb infrared rays entering from a wide angle at which light cannot normally be received and absorbed. As a result, an increase in an effective aperture is obtained, leading to an increase in sensitivity. However, in an array type sensor, the entire underside of the pixel area must be removed by etching, leading to a reduction in the physical strength of the pixel area.

In addition to this problem, the periphery of the sensor element is also thermally insulated by being hollowed out, and therefore the thermal resistance on the periphery of the sensor element increases. As a result, heat does not escape to the heat sink, leading to an increase in the thermal time constant. Moreover, an increase in noise occurs due to radiant heat from the periphery of the sensor element.

This invention has been designed to solve the problems described above, and an object thereof is to obtain a thermal infrared detector structured such that an improvement in detection sensitivity, a reduction in a thermal time constant, and an improvement in the physical strength of a pixel area can be realized, as well as a manufacturing method for the thermal infrared detector.

A thermal infrared detector according to this invention is a thermal infrared detector having trench structures, in which at least one sensor element is provided between the trench structures, an etching hole through which the sensor element is hollowed out and thereby thermally insulated is provided in a substrate rear surface or on the periphery of a pixel area, and an opening portion is provided below the pixel area.

Further, a manufacturing method for a thermal infrared detector according to this invention includes a step of forming an insulating film and a trench structure directly below a sensor element using a material having high etching selectivity relative to an Si substrate.

According to this invention, there is no need to provide an etching hole in the sensor element, and therefore the aperture can be increased. Moreover, the trench structure provided between the sensor elements remains connected to the substrate even after heat insulation hollowing processing, and therefore a structure that functions as a beam for supporting the pixel area is provided. As a result, a thermal infrared detector structured such that an improvement in detection sensitivity, a reduction in a thermal time constant, and an improvement in the physical strength of a pixel area can be realized, as well as a manufacturing method for the thermal infrared detector, can be obtained.

DESCRIPTION OF THE PREFERRED EMBODIMENTS

Preferred embodiments of a thermal infrared detector and a manufacturing method for a thermal infrared detector according to this invention will be described below using the drawings.

First Embodiment

Figure 1:
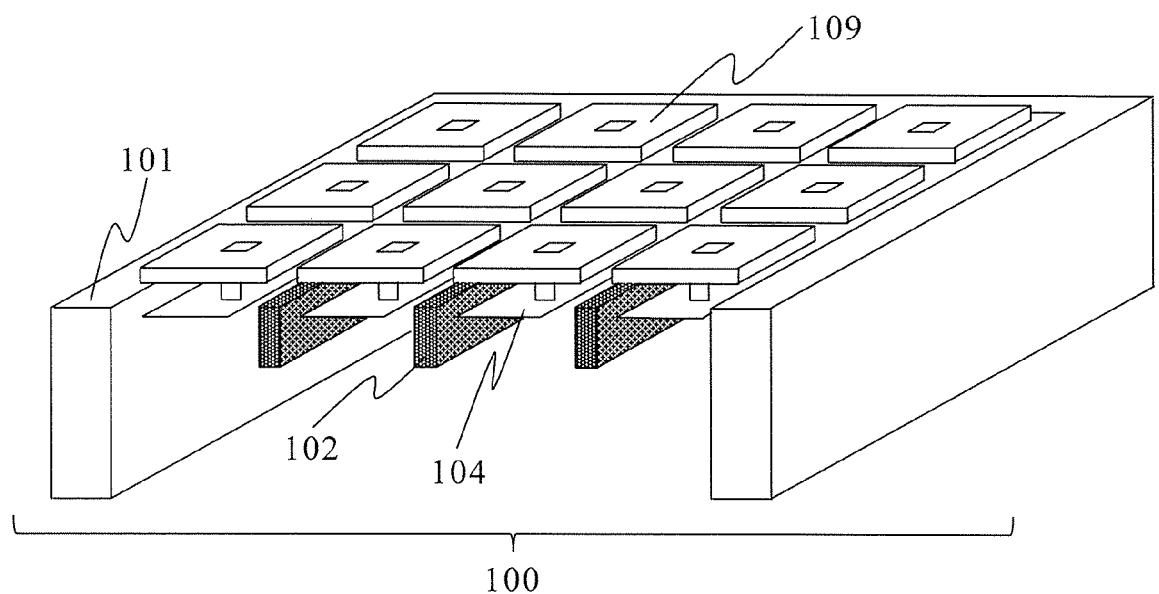
FIG. 1 is a bird's-eye view showing a thermal infrared detector according to a first embodiment of this invention.
Figure 2:
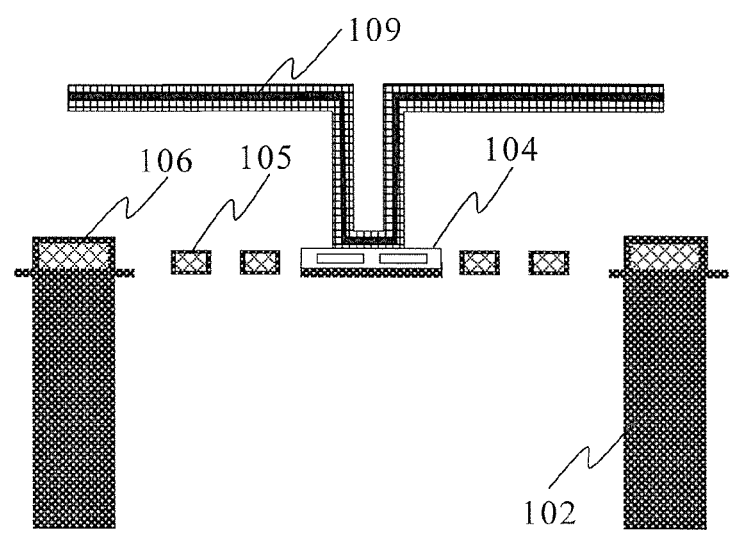
FIG. 2 is a sectional view of the thermal infrared detector according to the first embodiment of this invention.

FIG. 1 is a bird's-eye view showing a thermal infrared detector according to a first embodiment of this invention, and FIG. 2 is a sectional view of the thermal infrared detector according to the first embodiment of this invention. A thermal infrared detector 100 shown in FIGS. 1 and 2 is configured to include a substrate 101, a trench structure 102, a sensor element 104, a heat insulation support leg 105, a wire 106, and an infrared ray absorption structure 109.

In the thermal infrared detector 100 according to the first embodiment, heat insulation hollowing processing is performed without providing an etching hole in the infrared ray absorption structure 109. The thermal infrared detector 100 therefore has a larger aperture than the thermal infrared detector described in Japanese Patent No. 4224949, and as a result, the sensitivity of the thermal infrared detector can be improved.

Moreover, the trench structures 102 provided between the sensor elements remain connected to the substrate 101 even after the heat insulation hollowing processing, and therefore the trench structures 102 function as beams. As a result, the physical strength of a pixel area of the thermal infrared detector 100 can be increased in comparison with the thermal infrared detector described in Japanese Patent Application Publication No. 2014-199254.

Next, processes for manufacturing the thermal infrared detector according to the first embodiment will be described in sequence using FIGS. 3 to 10. FIGS. 3 to 10 are views showing a sequence of processes for manufacturing the thermal infrared detector according to the first embodiment of this invention. The thermal infrared detector 100 is manufactured on an Si substrate by similar processes to processes for manufacturing a semiconductor such as an LSI.

Figure 3:
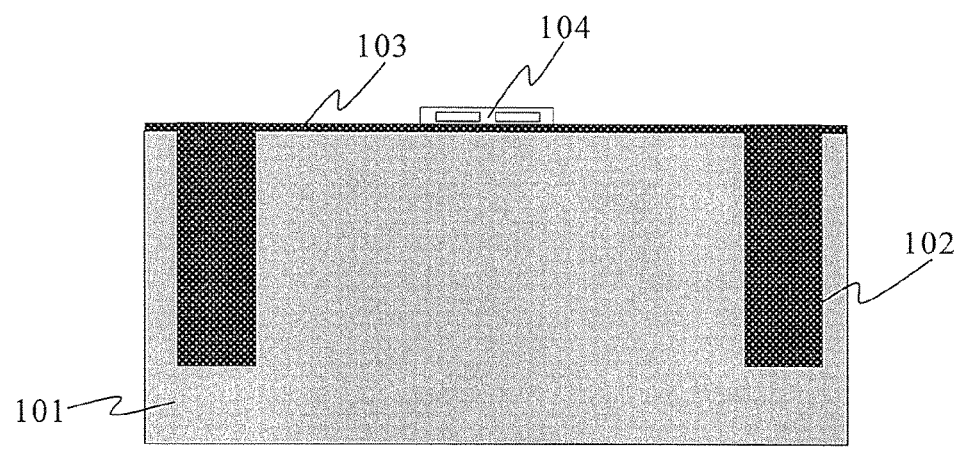
FIG. 3 is a view showing one of a sequence of processes for manufacturing the thermal infrared detector according to the first embodiment of this invention.

First, as shown in FIG. 3, openings are formed by dry etching in the substrate 101, which is constituted by an Si substrate, an SOI substrate, or the like, for example, in predetermined locations corresponding respectively to unit pixels. Further, the trench structure 102 is formed so as to be connected to a peripheral circuit region by forming an $SiO_2$ film serving as an insulating film 103 using a chemical vapor deposition (CVD) method or the like.

Here, an $SiO_2$ film is cited as the material used to form the trench structure 102 and the insulating film 103. However, the material is not limited to an $SiO_2$ film, and any material having high etching selectivity relative to an Si substrate so that insulation is secured between the sensor element and the Si substrate may be used.

Next, the $SiO_2$ film on the upper surface of the substrate 101 is removed using a CMP method or the like so that the upper surface is flattened. The insulating film 103 is then formed thereon, whereupon the sensor element 104 and a peripheral circuit, not shown in the drawings, are formed. A semiconductor element, a metal film element, or the like having a temperature characteristic of a diode or the like that converts detected heat into an electric signal corresponding to variation in a voltage value is used as the sensor element 104.

Figure 4:
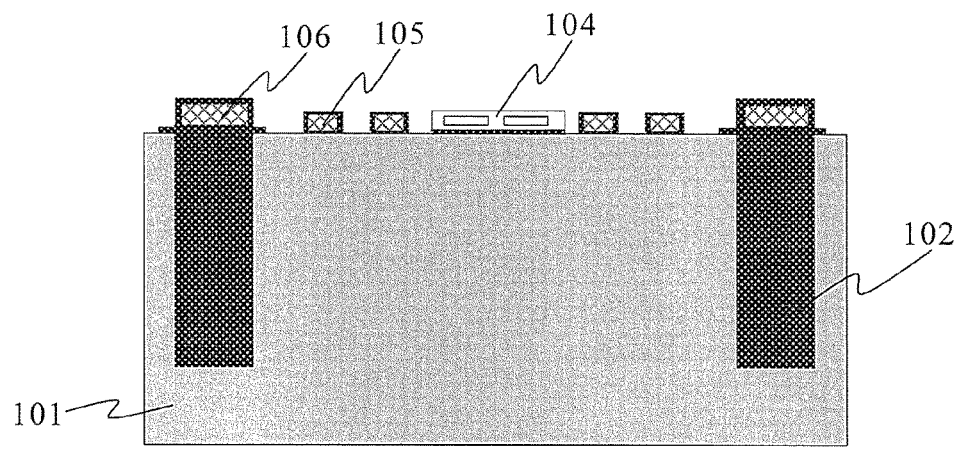
FIG. 4 is a view showing one of the sequence of processes for manufacturing the thermal infrared detector according to the first embodiment of this invention.

Next, as shown in FIG. 4, the heat insulation support leg 105 is formed on the upper surface of the substrate 101. The heat insulation support leg 105 is preferably formed from TiN, Ti, a Co compound, a Pt compound, WSi, or a laminated structure consisting thereof.

Next, the wire 106 is formed on the trench structure 102 from Al and a compound thereof, whereupon an insulating film constituted by an $SiO_2$ film, an SiN film, or the like is formed on the wire 106. Next, the insulating film is fashioned into a desired shape using a typical photoengraving technique or etching technique.

Through this series of processes, the sensor element 104 is connected to the wire 106 via the heat insulation support leg 105. At the same time, the wire 106 is connected to the peripheral circuit on the substrate 101 side.

Figure 5:
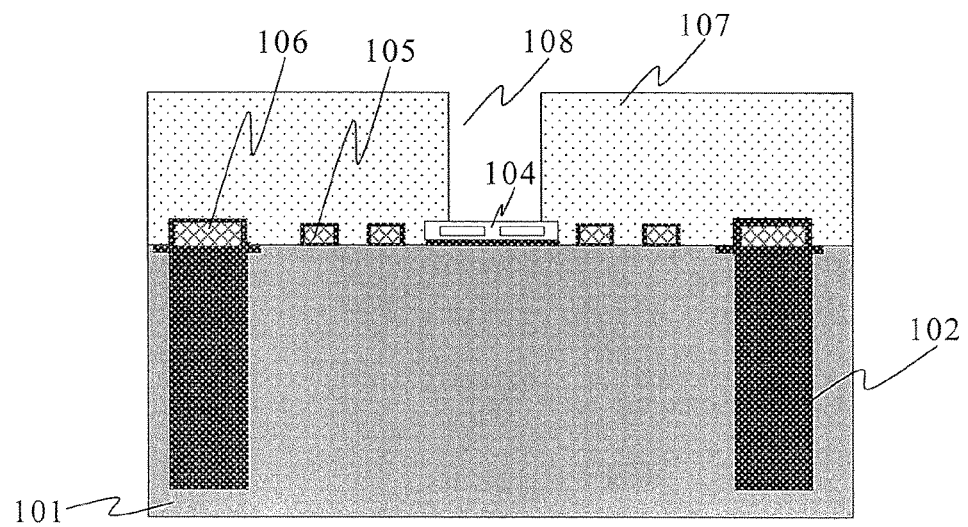
FIG. 5 is a view showing one of the sequence of processes for manufacturing the thermal infrared detector according to the first embodiment of this invention.

Next, as shown in FIG. 5, a sacrificial layer 107 used to form the infrared ray absorption structure 109 is formed on the upper surface of the substrate 101, and a support opening portion 108 is formed therein by patterning. Note that an organic material such as polyimide may be used as the material of the sacrificial layer 107.

Figure 6:
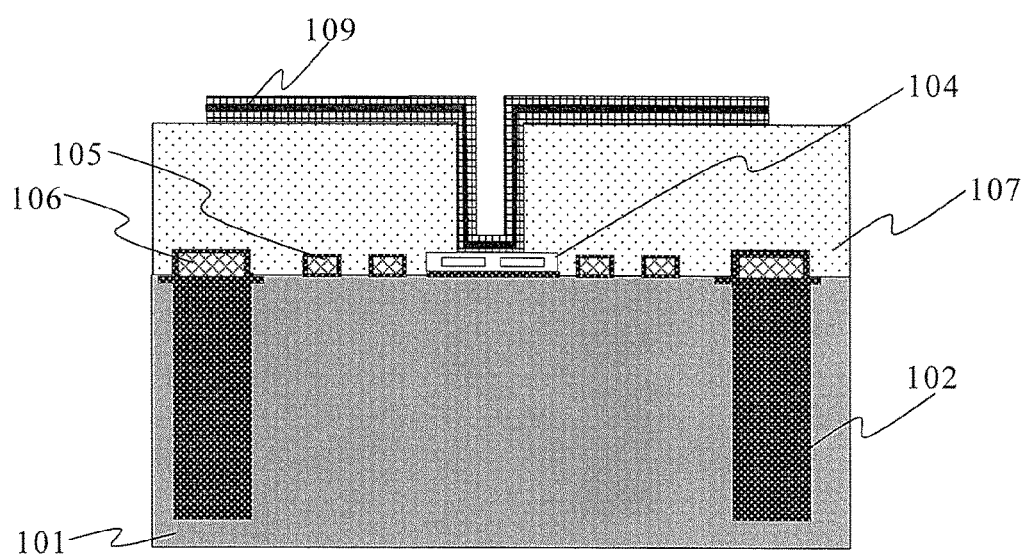
FIG. 6 is a view showing one of the sequence of processes for manufacturing the thermal infrared detector according to the first embodiment of this invention.

Next, as shown in FIG. 6, an insulating film constituted by an $SiO_2$ film, an SiN film, or the like is formed on the substrate 101 in the condition described above using a chemical vapor deposition method or the like in order to form the infrared ray absorption structure 109 on the sacrificial layer 107. Next, an infrared ray absorbing film formed from V, Ti, Cr, a Co compound, and a nitride or oxide thereof is formed thereon. Finally, an insulating film constituted by an $SiO_2$ film, an SiN film, or the like is formed thereon.

The resulting structure is then fashioned into a desired shape, whereby the infrared ray absorption structure 109 is obtained. At this time, there is no need to provide an etching hole in the infrared ray absorption structure 109, as in Japanese Patent No. 4224949 and so on, for example.

Figure 7:
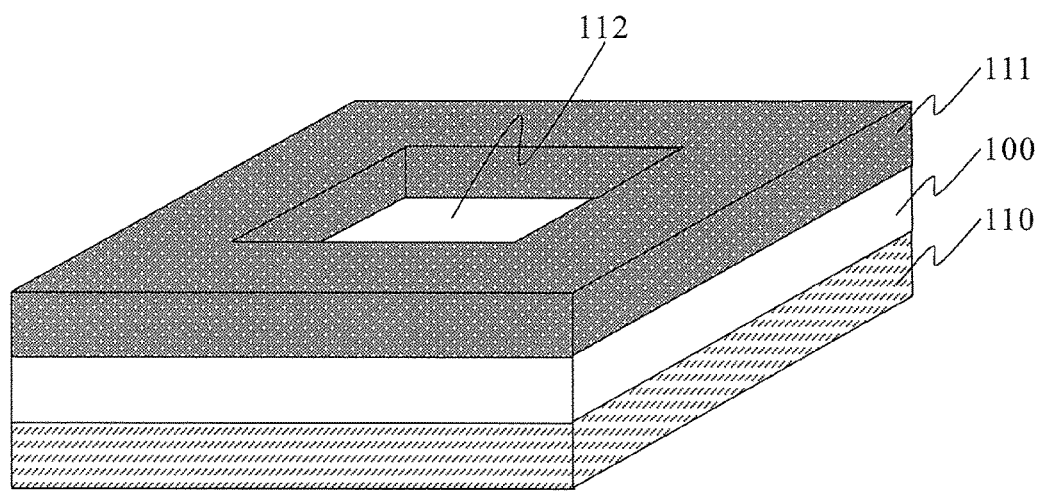
FIG. 7 is a view showing one of the sequence of processes for manufacturing the thermal infrared detector according to the first embodiment of this invention.

Next, as shown in FIG. 7, surface resist 110 is formed using a typical coater/developer on the upper surface of the substrate 101 in the location where the sensor element 104 is formed in order to protect the upper surface.

Next, rear surface resist 111 is applied to a rear surface of the substrate 101 using a typical photoengraving technique, whereupon a rear surface opening portion 112 is formed into a desired shape in a pixel area. Further, the sensor element is hollowed out and thereby thermally insulated by implementing etching below the rear surface, whereby the structure shown in FIG. 8 is obtained.

An etching method employing an inductive coupling plasma (ICP)-reactive ion etching (RIE) device or the like, or an etching method employing a gas such as $XeF_2$, $ClF_3$, or $BrF_3$ may be used as the method of implementing etching below the rear surface.

Figure 8:
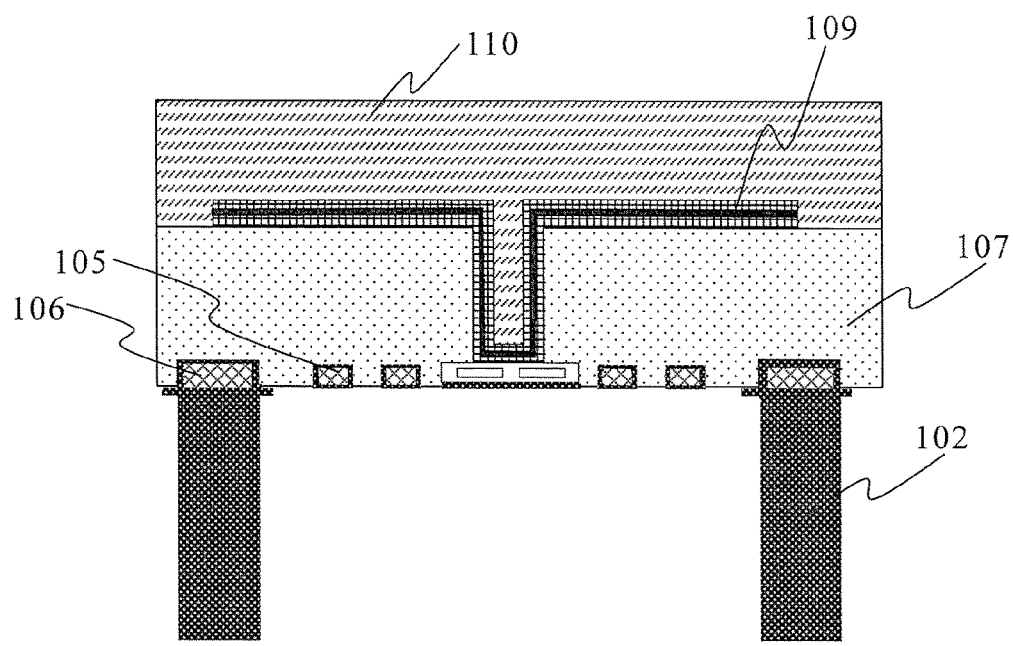
FIG. 8 is a view showing one of the sequence of processes for manufacturing the thermal infrared detector according to the first embodiment of this invention.
Figure 9:
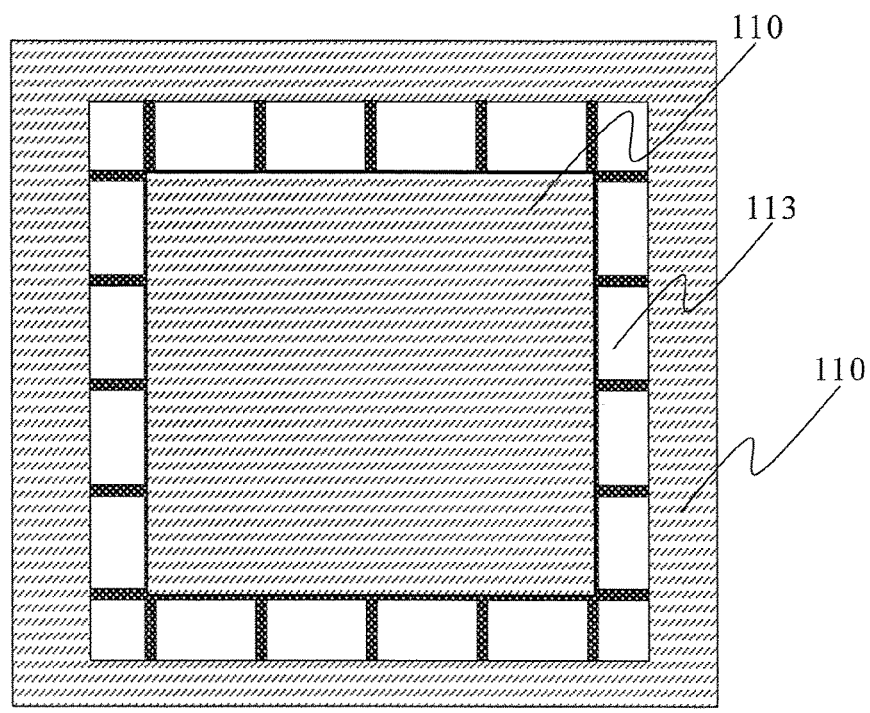
FIG. 9 is a view showing one of the sequence of processes for manufacturing the thermal infrared detector according to the first embodiment of this invention.

Further, as shown by the top view of the thermal infrared detector in FIG. 9, an upper surface opening portion 113 is provided in a pixel area peripheral portion, and by employing one of the etching methods described above from the upper surface opening portion, a thermal infrared detector having an identical structure to that of FIG. 8 can be obtained.

Figure 10:
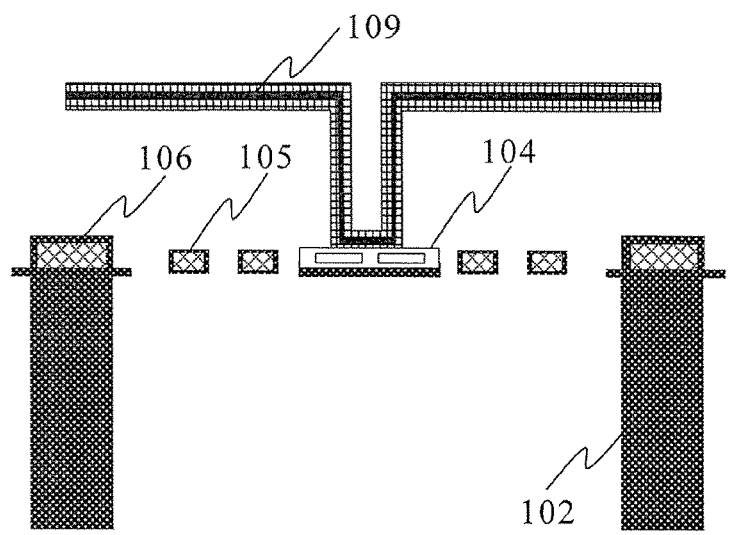
FIG. 10 is a view showing one of the sequence of processes for manufacturing the thermal infrared detector according to the first embodiment of this invention.

Finally, the sacrificial layer 107, surface resist 110, and rear surface resist 111 are etched from the condition shown in FIG. 8 using a resist removal technique such as anisotropic ashing, whereby the thermal infrared detector shown in FIG. 10 is completed. By forming an array of the thermal infrared detectors shown in FIG. 10, the thermal infrared detector 100 is obtained.

Here, the wire 106 and the trench structure 102 may be disposed in any positional relationship. By forming the trench structure 102 directly below the wire 106, as described in the first embodiment, however, light blockage by the wire does not have an effect. Moreover, a large region in which to form the sensor element 104 and the heat insulation support leg 105 can be secured, leading to an improvement in surface area efficiency. As a result, the sensitivity of the thermal infrared detector can be improved.

In the thermal infrared detector according to the first embodiment, as described above, etching is performed from the rear surface or the pixel area peripheral portion, thereby eliminating the need to form an etching hole in the sensor element. As a result, the aperture increases, leading to an improvement in the sensitivity of the thermal infrared detector.

Further, the trench structures provided between the sensor elements remain connected to the substrate even after the heat insulation hollowing processing, and therefore function as beams supporting the pixel area. As a result, the physical strength of the pixel area increases.

In the manufacturing method for a thermal infrared detector according to the first embodiment, during the processing for hollowing out and thereby thermally insulating the sensor element, the insulating film on the rear surface of the sensor element acts as an etching stop layer. Moreover, the shape of the trench structure is determined by self-alignment. Therefore, the high-precision photoengraving and etching techniques required in Japanese Patent No. 4224949, Japanese Patent No. 3944465, and Japanese Patent Application Publication No. 2014-199254 are not needed. As a result, the thermal infrared detector can be manufactured with few manufacturing irregularities and superior manufacturing robustness.

Second Embodiment

In a second embodiment of this invention, a thermal infrared detector in which a thermal resistance of the wire 106 for connecting the sensor element to the peripheral circuit can be reduced, enabling a reduction in a thermal time constant, by embedding a high thermal conductivity material 202 in a trench structure 203 will be described.

Processes for manufacturing the thermal infrared detector according to the second embodiment will be described in sequence using FIGS. 11 to 18. FIGS. 11 to 18 are views showing a sequence of processes for manufacturing the thermal infrared detector according to the second embodiment of this invention.

Note that FIGS. 13 to 18 show similar processes to the first embodiment, and therefore detailed description thereof has been omitted. Accordingly, in the second embodiment described below, only structures that are unique to the second embodiment and effects derived therefrom will be described, while description of other structures that are similar to the first embodiment has been omitted.

Figure 11:
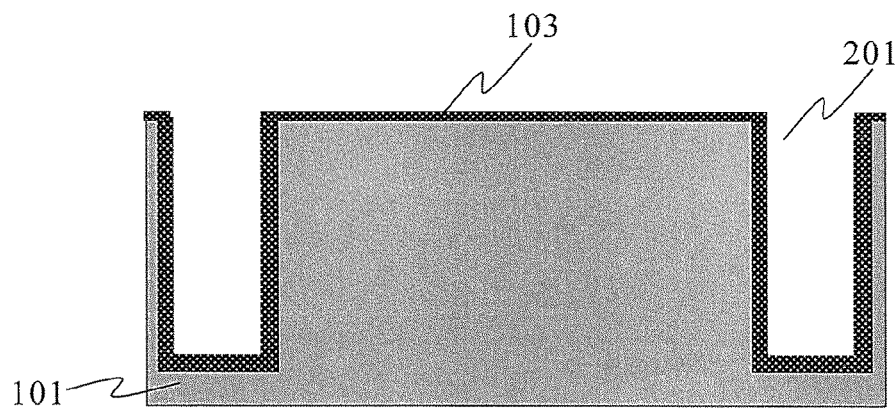
FIG. 11 is a view showing one of a sequence of processes for manufacturing a thermal infrared detector according to a second embodiment of this invention.

As shown in FIG. 11, openings are formed by dry etching in the substrate 101, which is constituted by an Si substrate, an SOI substrate, or the like, for example, in predetermined locations corresponding respectively to unit pixels. Further, a trench opening portion 201 is formed by forming an $SiO_2$ film serving as the insulating film 103 using a CVD method or the like.

Figure 12:
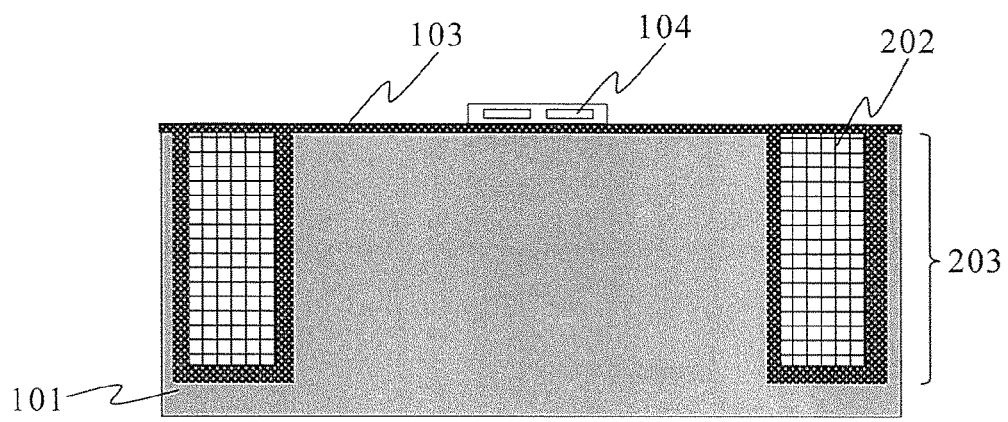
FIG. 12 is a view showing one of the sequence of processes for manufacturing the thermal infrared detector according to the second embodiment of this invention.
Figure 13:
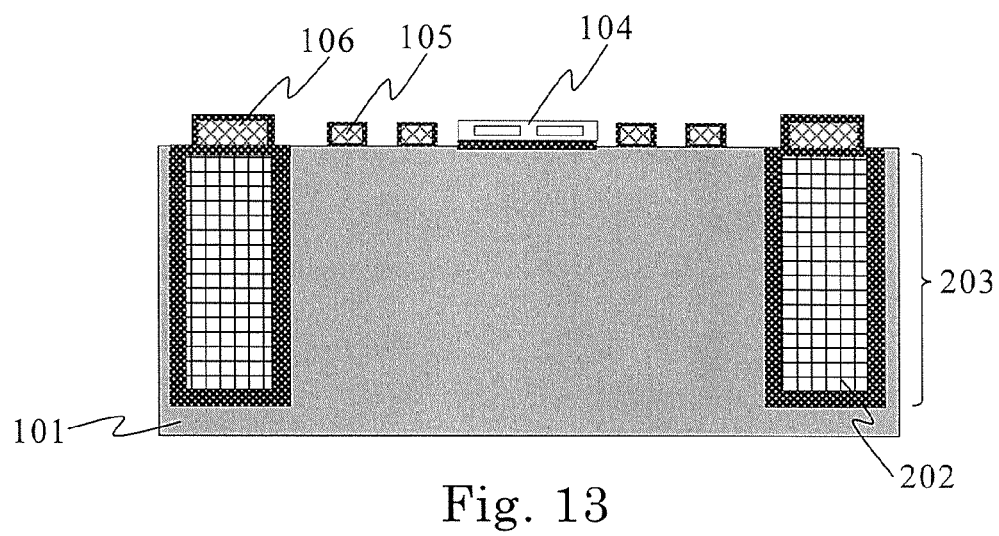
FIG. 13 is a view showing one of the sequence of processes for manufacturing the thermal infrared detector according to the second embodiment of this invention.
Figure 14:
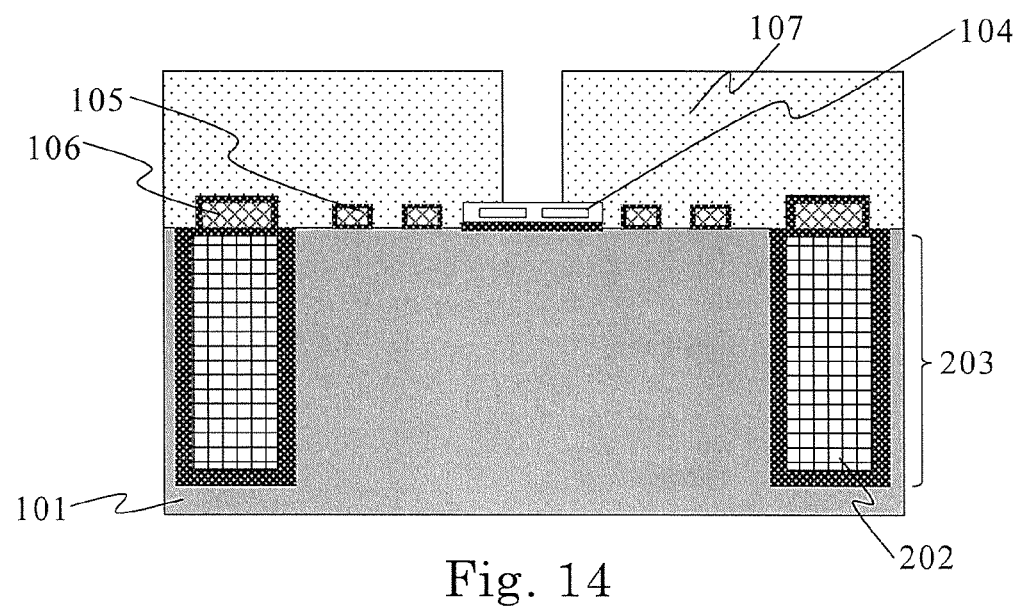
FIG. 14 is a view showing one of the sequence of processes for manufacturing the thermal infrared detector according to the second embodiment of this invention.
Figure 15:
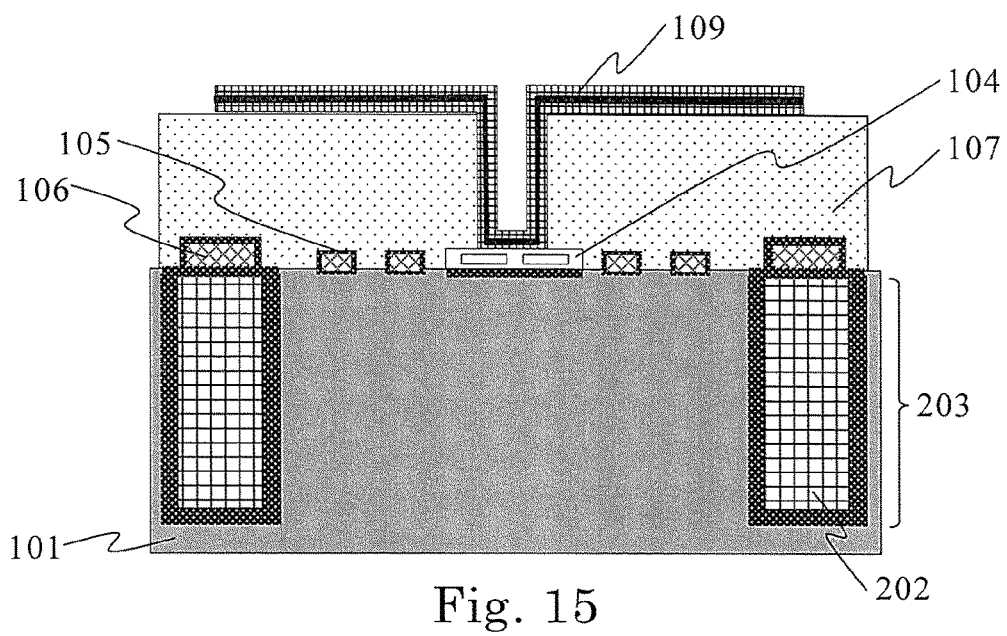
FIG. 15 is a view showing one of the sequence of processes for manufacturing the thermal infrared detector according to the second embodiment of this invention.

Next, as shown in FIG. 12, the high thermal conductivity material 202 is deposited on the substrate 101 using a CVD method or the like. Next, the high thermal conductivity material 202 on the upper surface of the substrate 101 is removed using a CMP method or the like so that the upper surface is flattened, whereupon the insulating film 103 is formed thereon from an $SiO_2$ film or the like. As a result, the trench structure 203 is formed such that the high thermal conductivity material 202 is embedded therein.

The high thermal conductivity material 202 may be any material having higher thermal conductivity than the $SiO_2$ film. More specifically, SiC, Si, or a typical metal film formed from Al and a compound thereof, Cu and a compound thereof, or the like, for example, may be employed as the high thermal conductivity material 202, although the high thermal conductivity material 202 is not limited thereto.

Figure 18:
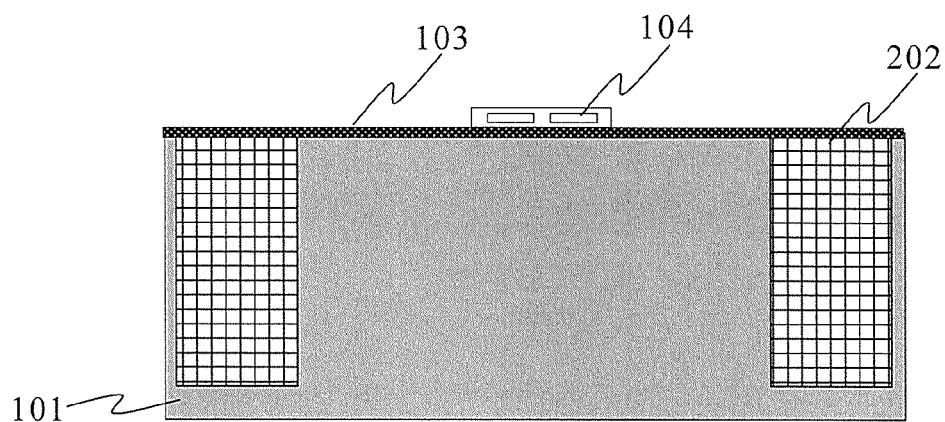
FIG. 18 is a view showing one of the sequence of processes for manufacturing the thermal infrared detector according to the second embodiment of this invention.

Further, as shown in FIG. 18, when a material having high etching selectivity relative to an Si substrate is used as the high thermal conductivity material 202, there is no need to form an $SiO_2$ film on a trench side wall, as shown in FIG. 11.

In FIG. 18, the substrate 101 may be opened by dry etching, the high thermal conductivity material 202 may be deposited therein using a CVD method or the like and then flattened using a CMP method or the like, and then the insulating film 103 may be formed on the high thermal conductivity material 202 from an $SiO_2$ film or the like.

Returning to FIG. 12, after forming the insulating film 103 on the substrate 101, the sensor element 104 and the peripheral circuit, not shown in the drawings, are formed. Thereafter, as shown in FIGS. 13 to 17, a thermal infrared detector including the trench structure 203 in which the high thermal conductivity material 202 is embedded, as shown in FIG. 17, is completed by implementing similar manufacturing processes to the first embodiment.

In the thermal infrared detector according to the second embodiment, as described above, the sensor element is thermally insulated using the heat insulation support leg, similarly to the first embodiment. Therefore, identical effects to the first embodiment are obtained.

Further, in the thermal infrared detector according to the second embodiment, the thermal resistance of the sensor element peripheral portion can be reduced by employing a trench structure in which a high thermal conductivity material is connected to the substrate (the heat sink). Accordingly, the thermal time constant of the thermal infrared detector can be reduced, and the effects of radiant heat from the sensor element peripheral portion can be reduced. As a result, noise can be reduced, enabling an improvement in an S/N ratio of the thermal infrared detector.

Furthermore, the second embodiment is effective in a case where the thermal resistance is designed in consideration of thermal saturation of the heat insulation support leg 105. Note, however, that in this case, a heat quantity of the sensor element must be taken into account.

Third Embodiment

In a third embodiment of this invention, a thermal infrared detector in which an infrared ray absorbing film is formed additionally on the rear surface side of the sensor element will be described.

Figure 19:
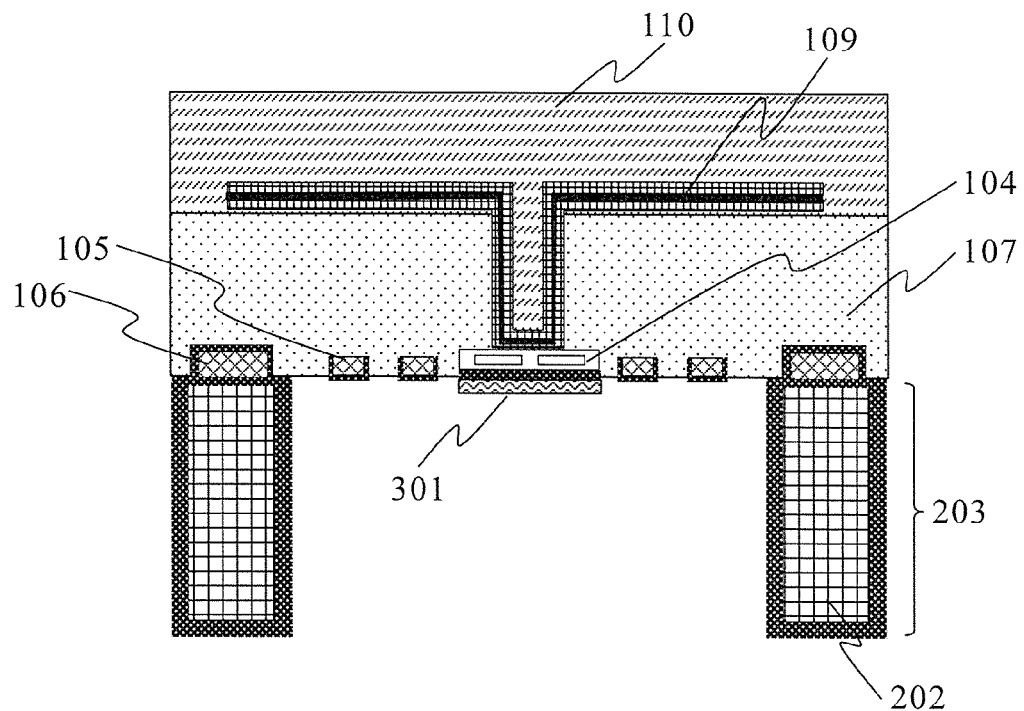
FIG. 19 is a view showing one of a sequence of processes for manufacturing a thermal infrared detector according to a third embodiment of this invention.
Figure 20:
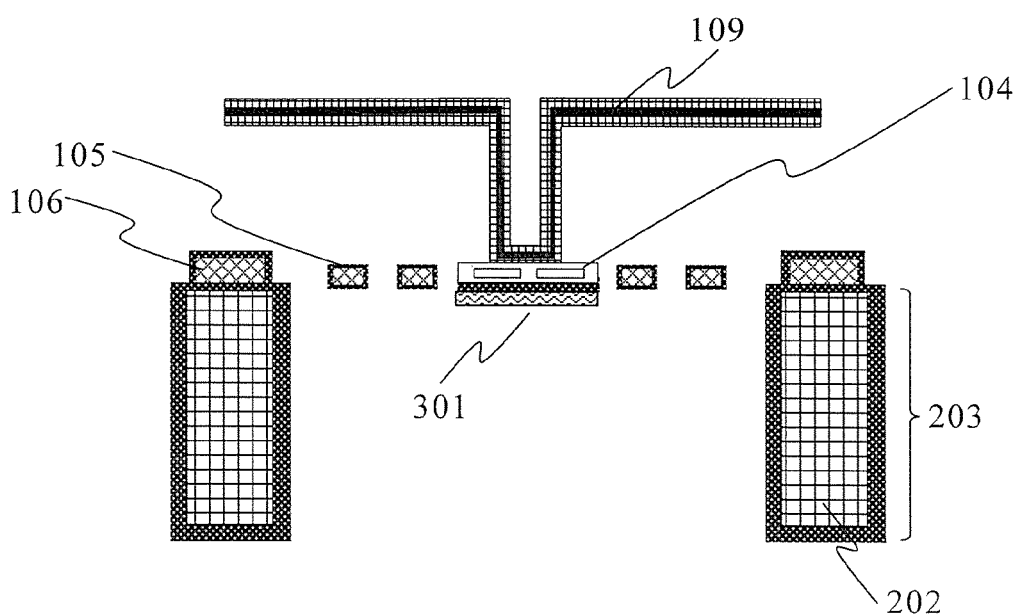
FIG. 20 is a view showing one of the sequence of processes for manufacturing the thermal infrared detector according to the third embodiment of this invention.

Newly added processes among processes for manufacturing the thermal infrared detector according to the third embodiment will be described in sequence below using FIGS. 19 and 20. FIGS. 19 and 20 are views showing a sequence of processes for manufacturing the thermal infrared detector according to the third embodiment of this invention.

Figure 16:
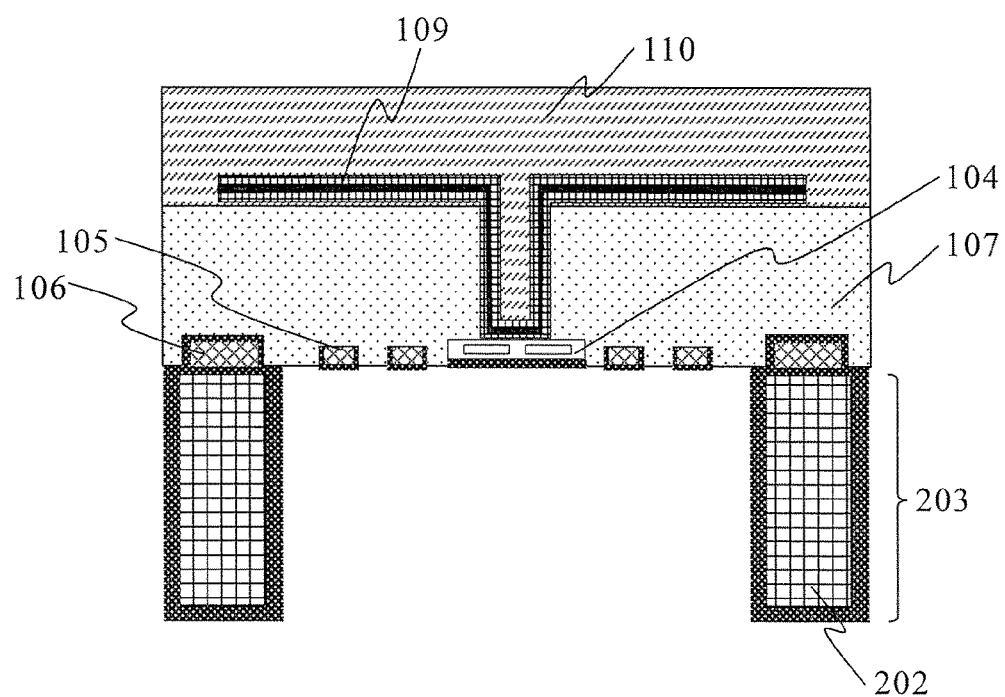
FIG. 16 is a view showing one of the sequence of processes for manufacturing the thermal infrared detector according to the second embodiment of this invention.
Figure 17:
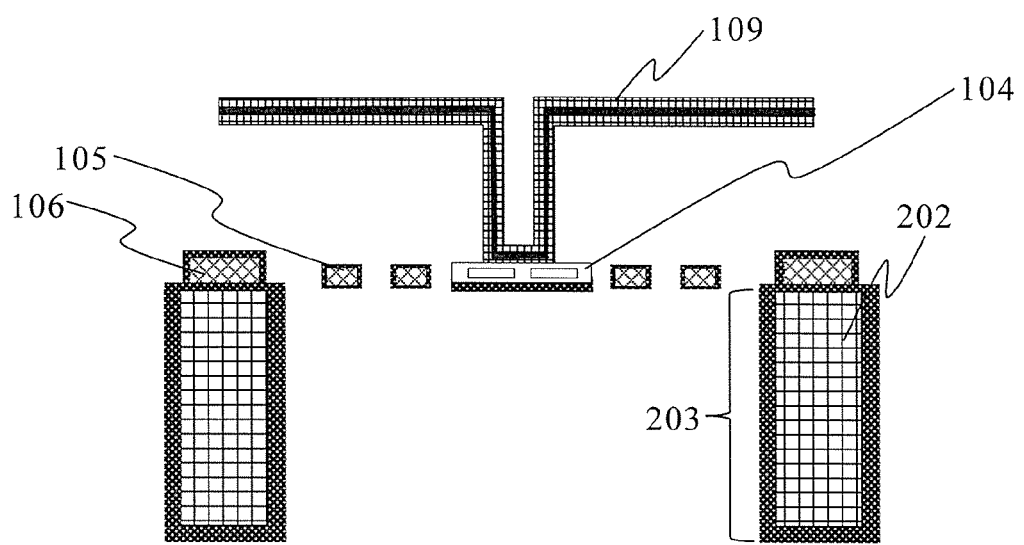
FIG. 17 is a view showing one of the sequence of processes for manufacturing the thermal infrared detector according to the second embodiment of this invention.

As shown in FIG. 19, following the process shown in FIG. 8 of the first embodiment or the process shown in FIG. 16 of the second embodiment, an infrared ray absorbing film 301 is formed on a rear surface of a wafer from vanadium, titanium, chrome, a Co-based compound, and a nitride or oxide thereof using a CVD method or the like.

Next, the infrared ray absorbing film 301 is removed from all regions apart from the region of the sensor element 104 using a photoengraving technique and an etching technique. Following this process, similar processes to the first or second embodiment are implemented, whereby a thermal infrared detector shown in FIG. 20 is formed.

Needless to mention, with the thermal infrared detector according to the third embodiment, as described above, identical effects to the first and second embodiments are obtained. Furthermore, in the thermal infrared detector according to the third embodiment, the infrared ray absorption efficiency is improved by the infrared absorbing film formed on the rear surface of the sensor element, and as a result, the sensitivity of the thermal infrared detector can be improved.

Note that a structure having the infrared ray absorbing film according to the third embodiment may also be applied to a fourth embodiment to be described below, and it goes without saying that in so doing, identical effects to those described above are obtained.

Fourth Embodiment

In the fourth embodiment of this invention, a thermal infrared detector in which an infrared ray reflecting film is formed additionally in the interior of the trench structure will be described.

Figure 21:
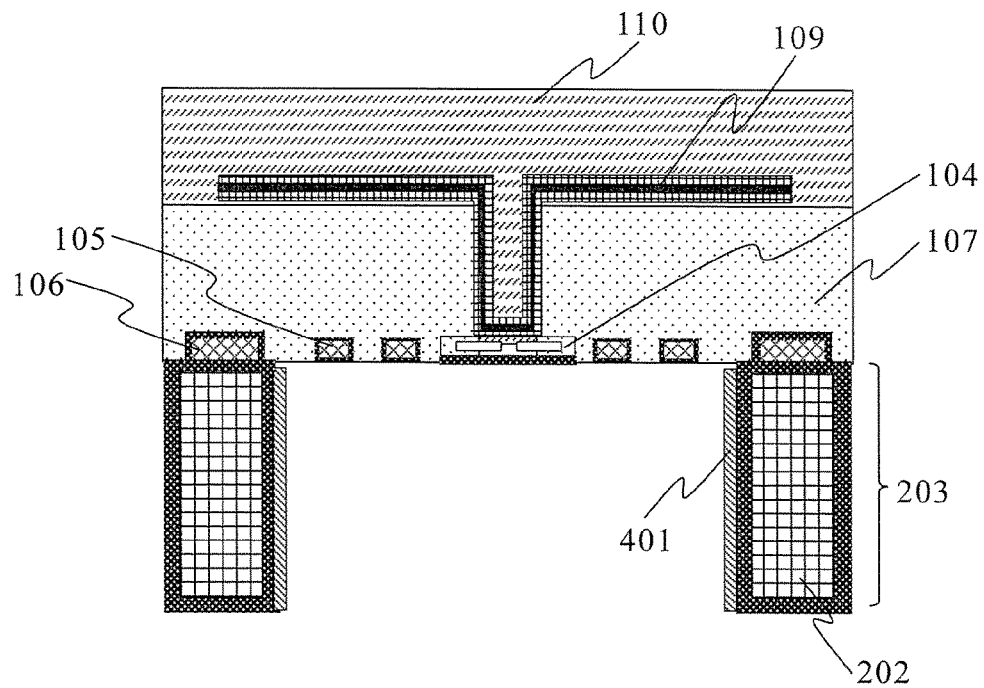
FIG. 21 is a view showing one of a sequence of processes for manufacturing a thermal infrared detector according to a fourth embodiment of this invention.
Figure 22:
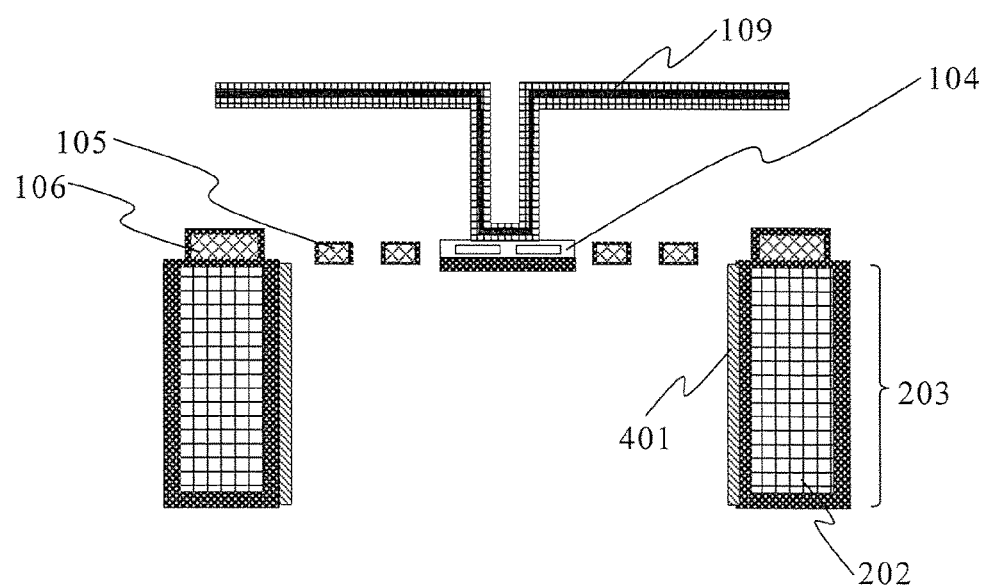
FIG. 22 is a view showing one of the sequence of processes for manufacturing the thermal infrared detector according to the fourth embodiment of this invention.
Figure 23:
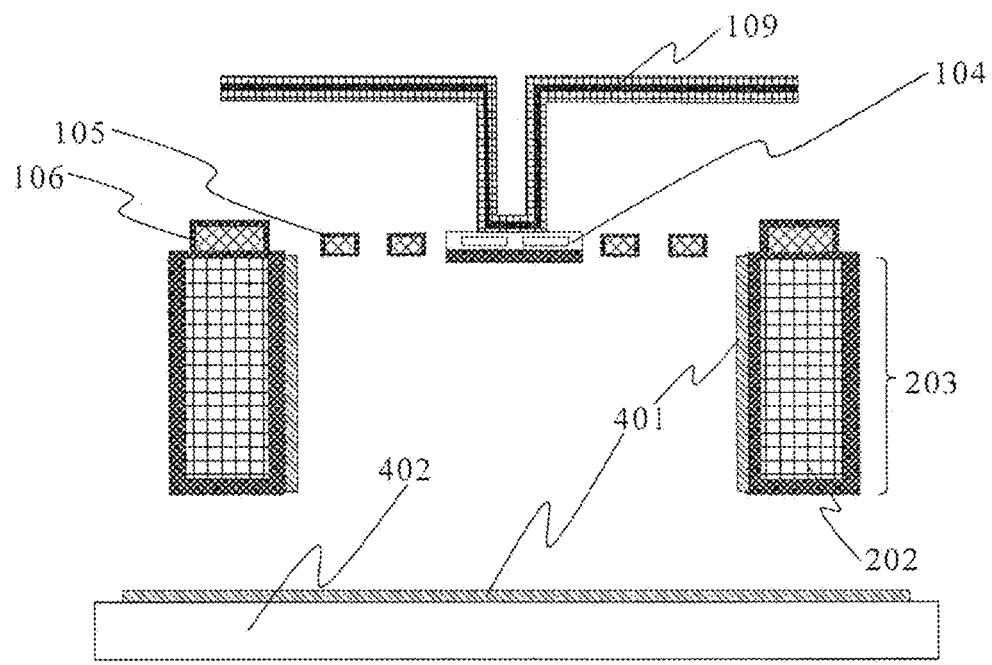
FIG. 23 is a view showing one of the sequence of processes for manufacturing the thermal infrared detector according to the fourth embodiment of this invention.

Newly added processes among processes for manufacturing the thermal infrared detector according to the fourth embodiment will be described in sequence below using FIGS. 21 to 23. FIGS. 21 to 23 are views showing a sequence of processes for manufacturing the thermal infrared detector according to the fourth embodiment of this invention.

As shown in FIG. 21, following the process shown in FIG. 8 of the first embodiment or the process shown in FIG. 16 of the second embodiment, an infrared ray reflecting film 401 is formed in the interior of the trench structure using a CVD method or the like.

All metals exhibit high infrared reflectance in a dominant absorption wavelength of a thermal infrared detector, i.e. between 8 and 14 μm. Therefore, any metal may be used as the material of the infrared ray reflecting film 401. Specific examples of the material of the infrared ray reflecting film 401 include Al, Ag, Au, Cu, Co, Pt, and so on. Note that in order to increase the reflection efficiency, these materials may be used in the form of a multilayer film.

Next, the infrared ray reflecting film 401 is removed from all regions apart from the trench side wall using a photoengraving technique and an etching technique. Following this process, similar processes to the first or second embodiment are implemented, whereby a thermal infrared detector shown in FIG. 22 is formed.

A case in which the thermal infrared detector having the infrared ray reflecting film 401 on the trench structure side wall is mounted on a package 402 will now be considered. In this case, by forming the infrared ray reflecting film 401 on an uppermost surface of the package, a thermal infrared detector having the infrared ray reflecting film 401 on the trench structure side wall and the uppermost surface of the package, as shown in FIG. 23, is completed.

Note that when a material (for example, Al and a compound thereof, Cu and a compound thereof, Au, Ag, Pt, and so on, or a multilayer film consisting thereof) having high thermal conductivity and high infrared reflectance in addition to high etching selectivity relative to an Si substrate is used in the trench structure in FIG. 4 instead of an $SiO_2$ film, as shown in FIG. 18, the effects described in the third embodiment can be obtained simultaneously.

Needless to mention, with the thermal infrared detector according to the fourth embodiment, as described above, identical effects to the first and second embodiments are obtained. Furthermore, in the thermal infrared detector according to the fourth embodiment, infrared rays that pass through the infrared ray absorption structure and the sensor element can be reflected multiply by the infrared ray reflecting film formed on the trench side wall and the package upper surface so as to be reabsorbed by the infrared ray absorption structure and the sensor element. As a result, the sensitivity of the thermal infrared detector can be improved.

Note that an optical distance from the sensor element 104 and the infrared ray absorption structure 109 to the infrared ray reflecting film 401 on the package upper surface is preferably set at an odd number multiple of substantially one quarter of the wavelength of a detected infrared ray (in other words, when the wavelength of the detected infrared ray is $\lambda$, $\lambda/4+m\lambda/2$, where m=0, 1, 2, ... ). In so doing, a resonance structure can be formed between the infrared ray reflecting film 401 on the package upper surface and the sensor element 104 and infrared ray absorption structure 109, enabling an improvement in the infrared ray absorption efficiency. As a result, the sensitivity of the thermal infrared detector can be increased.

Fifth Embodiment

In a fifth embodiment of this invention, a thermal infrared detector in which the aperture is increased in order to improve the sensitivity thereof will be described.

Figure 29:
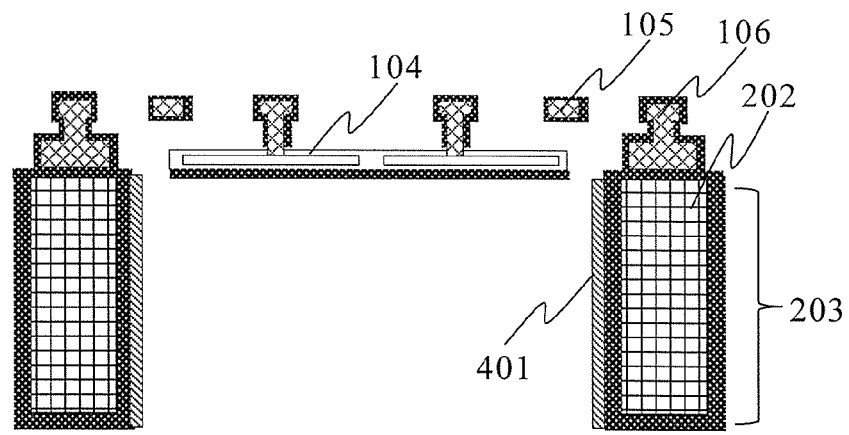
FIG. 29 is a view showing one of the sequence of processes for manufacturing the thermal infrared detector according to the fifth embodiment of this invention.

As shown in FIG. 29, to be described below, in a back-illuminated thermal infrared detector according to the fifth embodiment, the sensor element 104 and the heat insulation support leg 105 are formed on separate planes, with the result that light reception and absorption areas of the sensor element 104 can be enlarged, and an area of the substrate below the pixel region can be etched entirely during the heat insulation hollowing processing so that infrared rays enter from the rear surface side. Thus, the heat insulation support leg 105 does not exert a light blocking effect, and therefore a highly sensitive thermal infrared detector having an increased aperture is obtained.

Further, by forming the sensor element 104 and the heat insulation support leg 105 on separate planes, an area in which the heat insulation support leg 105 can be formed increases. As a result, the thermal resistance of the sensor element can be increased, leading to a corresponding improvement in sensitivity.

In addition, infrared rays entering from a wide angle side, which are usually absorbed by the trench structure and the substrate and cannot therefore be absorbed by the sensor element, are reflected multiply using the infrared ray reflecting film 401 provided on the trench structure side wall, and therefore these infrared rays can be received and absorbed by the sensor element 104. As a result, the effective aperture increases, leading to an improvement in the sensitivity of the thermal infrared detector.

Next, processes for manufacturing the thermal infrared detector according to the fifth embodiment will be described in sequence using FIGS. 24 to 29. FIGS. 24 to 29 are views showing a sequence of processes for manufacturing the thermal infrared detector according to the fifth embodiment of this invention.

Figure 27:
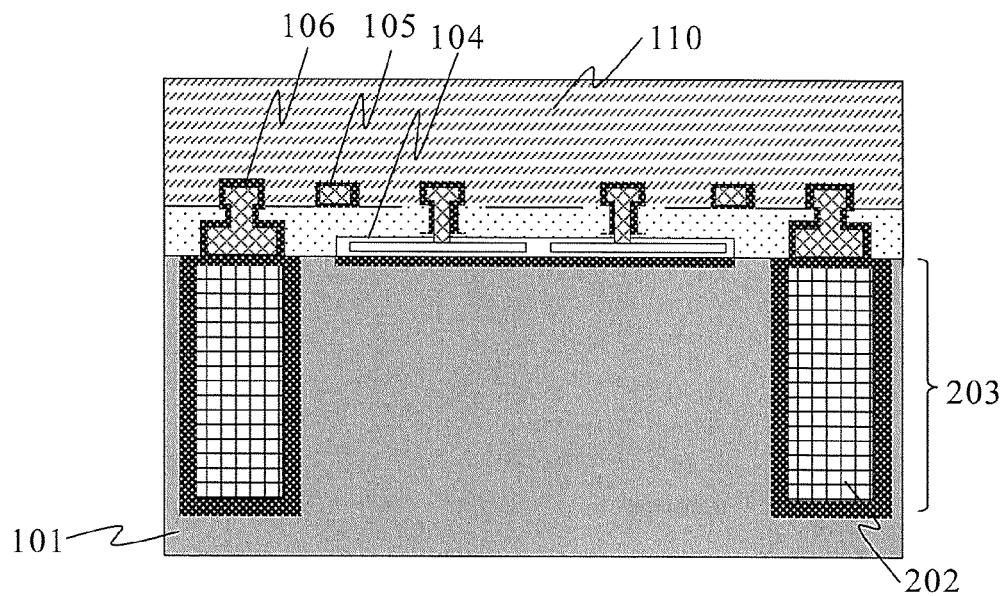
FIG. 27 is a view showing one of the sequence of processes for manufacturing the thermal infrared detector according to the fifth embodiment of this invention.
Figure 28:
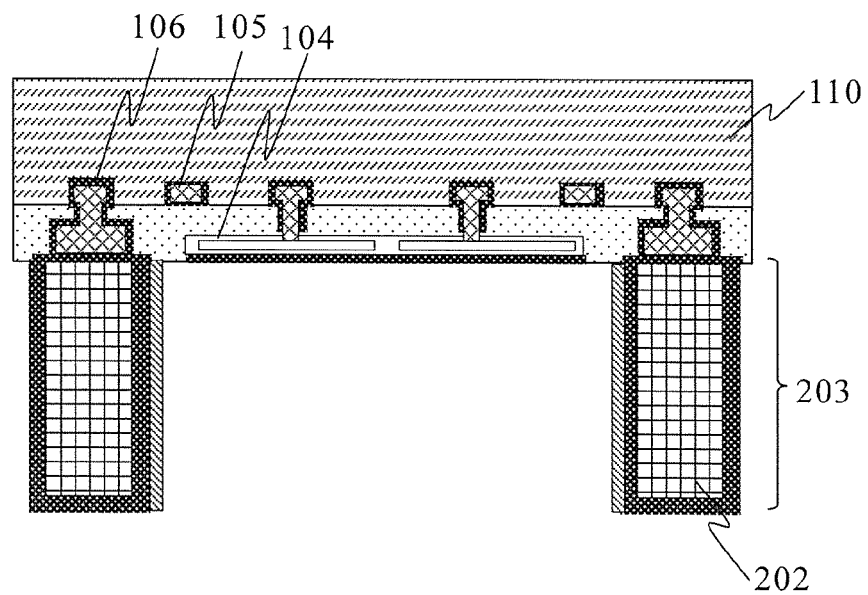
FIG. 28 is a view showing one of the sequence of processes for manufacturing the thermal infrared detector according to the fifth embodiment of this invention.

Note that FIGS. 27 to 29 show similar processes to the second and fourth embodiments, and therefore detailed description thereof has been omitted. Accordingly, in the fifth embodiment described below, only structures that are unique to the fifth embodiment and effects derived therefrom will be described, while description of other structures that are similar to the second and fourth embodiments has been omitted.

Figure 24:
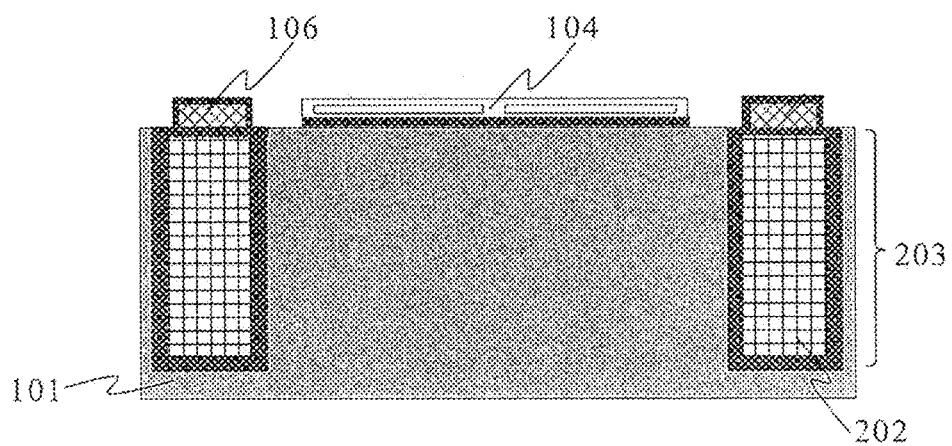
FIG. 24 is a view showing one of a sequence of processes for manufacturing a thermal infrared detector according to a fifth embodiment of this invention.

First, as shown in FIG. 24, the trench structure 203 and the insulating film 103 are formed on the substrate 101 using a similar method to the second embodiment, as shown in FIG. 4, whereupon the sensor element 104 and the wire 106 are formed.

Note that at this time, as shown in FIG. 18, a material (for example, Al and a compound thereof, Cu and a compound thereof, Au, Ag, Pt, and so on, or a multilayer film consisting thereof) having high thermal conductivity and high infrared reflectance in addition to high etching selectivity relative to an Si substrate may be used in the trench structure in FIG. 4 instead of an $SiO_2$ film.

Figure 25:
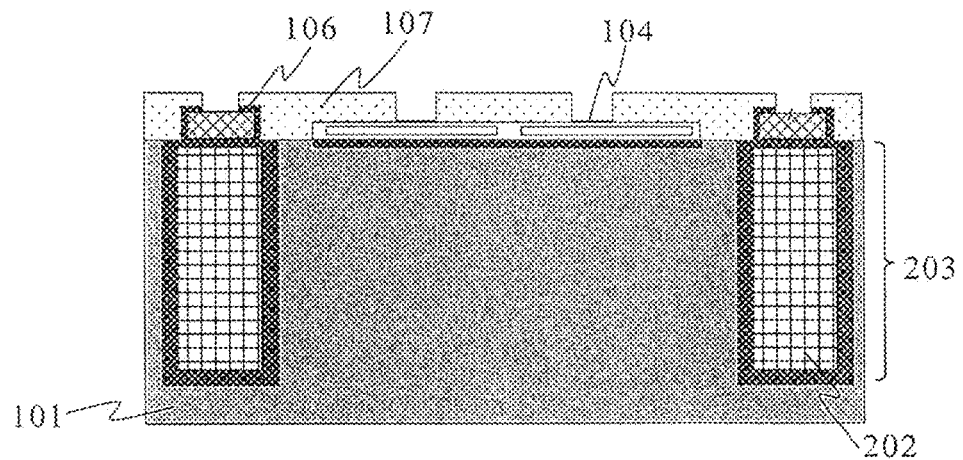
FIG. 25 is a view showing one of the sequence of processes for manufacturing the thermal infrared detector according to the fifth embodiment of this invention.

Next, as shown in FIG. 25, the sacrificial layer 107 used to form the heat insulation support leg 105 is formed on the upper surface of the substrate 101, whereupon an upper portion of the sensor element 104 and an upper portion of the wire 106 are opened by patterning. Note that similarly to the first embodiment, an organic material such as polyimide may be used as the material of the sacrificial layer 107.

Figure 26:
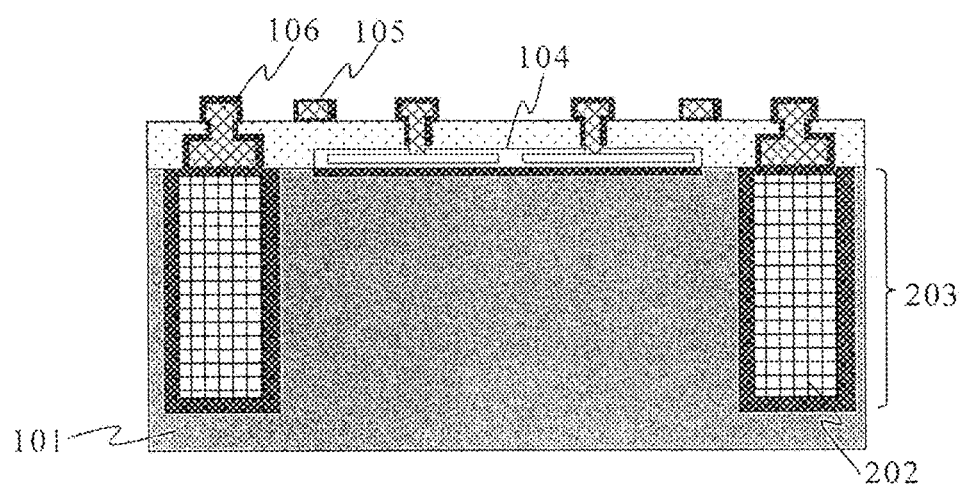
FIG. 26 is a view showing one of the sequence of processes for manufacturing the thermal infrared detector according to the fifth embodiment of this invention.

Next, as shown in FIG. 26, the heat insulation support leg 105 is formed on the upper surface of the substrate 101. The heat insulation support leg 105 is preferably formed from TiN, Ti, a Co compound, a Pt compound, WSi, or a laminated structure consisting thereof.

Next, an insulating film constituted by an $SiO_2$ film, an SiN film, or the like is formed on the heat insulation support leg 105. Next, the insulating film is fashioned into a desired shape using a typical photoengraving technique or etching technique. Through this series of processes, the sensor element 104 is connected to the wire 106 electrically and physically via the heat insulation support leg 105.

Thereafter, the back-illuminated thermal infrared detector shown in FIG. 29, which includes the sensor element 104, the heat insulation support leg 105 and the wire 106 formed on a separate plane to the sensor element 104, and the infrared ray reflecting film 401 formed on the trench structure side wall, is completed by implementing similar manufacturing processes to the third and fourth embodiments, as shown in FIGS. 27 to 29.

In the back-illuminated thermal infrared detector according to the fifth embodiment, as described above, the sensor element and the heat insulation support leg are formed on separate planes, with the result that the light reception and absorption areas of the sensor element are enlarged. Further, in addition to this structure, the back-illuminated thermal infrared detector according to the fifth embodiment includes a structure in which the area of the substrate below the pixel region is etched entirely during the heat insulation hollowing processing so that infrared rays enter from the rear surface side. By providing this structure, the heat insulation support leg is prevented from exerting a light blocking effect, and therefore a highly sensitive thermal infrared detector having an increased aperture is obtained.

Furthermore, by forming the sensor element and the heat insulation support leg on separate planes instead of providing the sensor element and the heat insulation support leg on an identical plane, it is possible to increase the area in which the heat insulation support leg can be formed when the pixel count is increased and the pixel pitch is reduced. As a result, the thermal resistance of the sensor element can be increased, leading to an improvement in sensitivity.

In addition, infrared rays entering from the wide angle side, which are usually absorbed by the trench structure and the substrate and cannot therefore be received and absorbed by the sensor element, are reflected multiply using the infrared ray reflecting film provided on the trench structure side wall, and therefore these infrared rays can be received and absorbed by the sensor element. As a result, the effective aperture increases, leading to an improvement in the sensitivity of the thermal infrared detector.

Sixth Embodiment

In a sixth embodiment of this invention, a thermal infrared detector in which a plasmonic absorber is formed additionally on the rear surface side of the sensor element will be described.

By forming a plasmonic absorber such as that described in Japanese Patent No. 4964935, for example, on the rear surface side of the sensor element 104, a back-illuminated thermal infrared detector having functions such as wavelength selectivity and polarization detectability is obtained.

Figure 30:
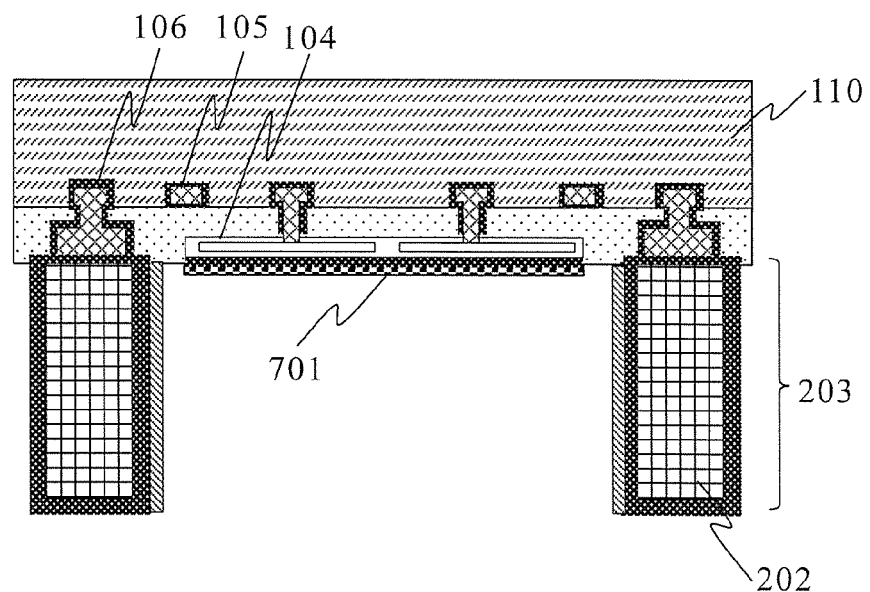
FIG. 30 is a view showing one of a sequence of processes for manufacturing a thermal infrared detector according to a sixth embodiment of this invention.
Figure 31:
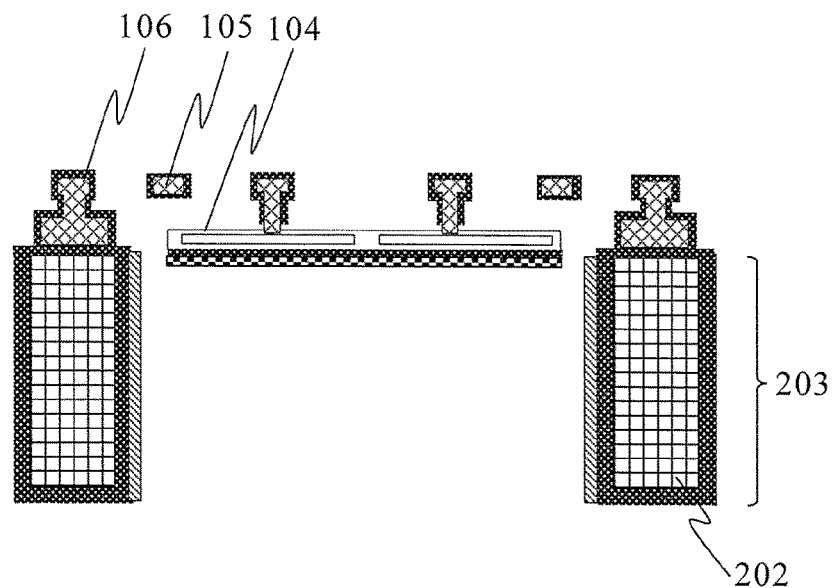
FIG. 31 is a view showing one of the sequence of processes for manufacturing the thermal infrared detector according to the sixth embodiment of this invention.

Newly added processes among processes for manufacturing the thermal infrared detector according to the sixth embodiment will be described in sequence below using FIGS. 30 and 31. FIGS. 30 and 31 are views showing a sequence of processes for manufacturing the thermal infrared detector according to the sixth embodiment of this invention.

As shown in FIG. 30, following the process of FIG. 28, a metal film is formed on a rear surface of a wafer from Al, Au, Ag, or the like using a CVD method or the like, whereupon the metal film is fashioned into a periodic structure on which surface plasmons are excited using a photoengraving technique and an etching technique. The metal film thickness and the periodic structure differ according to the function to be added to the sensor element 104.

Next, the metal film is removed from all regions apart from the region of the sensor element using a photoengraving technique and an etching technique. Thereafter, a back-illuminated thermal infrared detector having a plasmonic absorber 701 (in other words, wavelength selectivity or polarization detectability) on the rear surface of the sensor element, as shown in FIG. 31, is completed by implementing similar processes to the fifth embodiment.

In the back-illuminated thermal infrared detector according to the sixth embodiment, as described above, functions such as wavelength selectivity and polarization detectability are provided by forming a plasmonic absorber. Accordingly, the size of the sensor element can be enlarged up to the vicinity of the wire of the sensor element, enabling an increase in the number of plasmonic absorbers that can be disposed. Hence, output variation due to variation in the shapes of the plasmonic absorbers can be evened out, and as a result, a back-illuminated thermal infrared detector exhibiting little characteristic variation from pixel to pixel is obtained.

Figure 32:
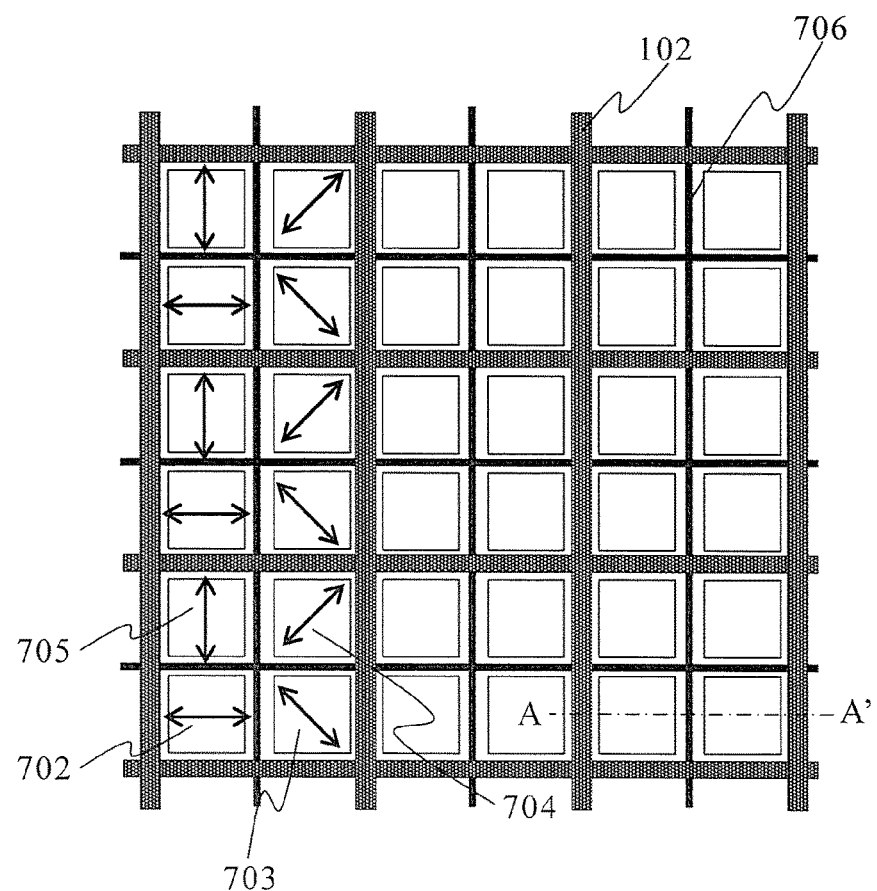
FIG. 32 is an illustrative view illustrating a case in which a back-illuminated thermal infrared detector according to the sixth embodiment of this invention is applied to polarization detection.
Figure 33:
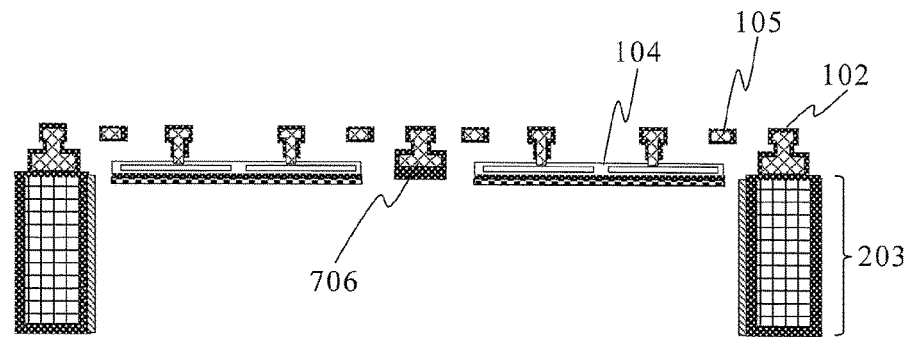
FIG. 33 is an illustrative view illustrating a case in which the back-illuminated thermal infrared detector according to the sixth embodiment of this invention is applied to polarization detection.

Next, an example in which the back-illuminated thermal infrared detector according to the sixth embodiment is applied to polarization detection will be described. FIGS. 32 and 33 are illustrative views illustrating a case in which the back-illuminated thermal infrared detector according to the sixth embodiment of this invention is applied to polarization detection.

The back-illuminated thermal infrared detector shown in FIG. 32 includes a 0-degree polarization detection sensor element 702, a 45-degree polarization detection sensor element 703, a 135-degree polarization detection sensor element 704, and a 90-degree polarization detection sensor element 705. A structure in which these four polarization detection sensor elements 702 to 705 are bundled together is disposed periodically.

The polarization detection sensor elements 702 to 705 together form a plasmonic absorber that is capable of detecting a desired polarization angle. As described in Japanese Patent No. 4964935, for example, the plasmonic absorber that absorbs the polarization angle may be formed in an elliptical shape or a rectangular shape.

Further, as long as the physical strength of the pixel region is sufficient, the trench structure 102 may be disposed in units of several pixels, as shown in FIG. 32, rather than for each unit pixel.

FIG. 33 is a sectional view taken along an A-A' line in FIG. 32. As shown in FIG. 33, a wire 706 does not include a trench structure. By disposing the polarization detection sensor elements 702 to 705 in this manner, a back-illuminated thermal infrared detector capable of detecting different polarization angles in each pixel is obtained.

Moreover, by employing this manufacturing method, the plasmonic absorber can be manufactured after manufacturing the sensor element 104. As a result, characteristic deterioration and a reduction in reliability can be prevented from occurring in the sensor element due to roughness and the quality of a backing film.

Further, the infrared ray absorbing film 301 of the third embodiment may be formed on the rear surface of the sensor element 104 in place of the plasmonic absorber 701. In this case, similar effects to the third embodiment are obtained.

Seventh Embodiment

In a seventh embodiment of this invention, a back-illuminated thermal infrared detector including the infrared ray absorption structure 109 will be described.

Newly added processes among processes for manufacturing the back-illuminated thermal infrared detector according to the seventh embodiment will be described in sequence below using FIGS. 34 to 38. FIGS. 34 to 38 are views showing a sequence of processes for manufacturing the thermal infrared detector according to the seventh embodiment of this invention.

Figure 34:
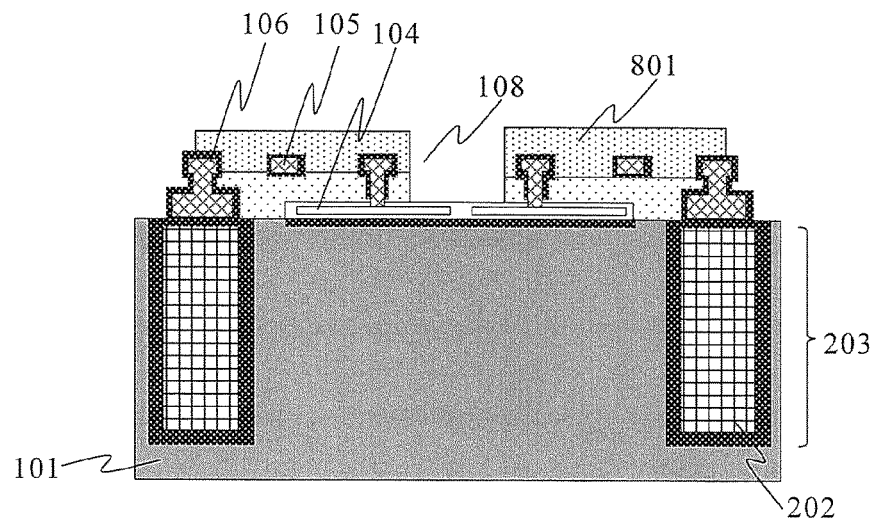
FIG. 34 is a view showing one of a sequence of processes for manufacturing a thermal infrared detector according to a seventh embodiment of this invention.
Figure 35:
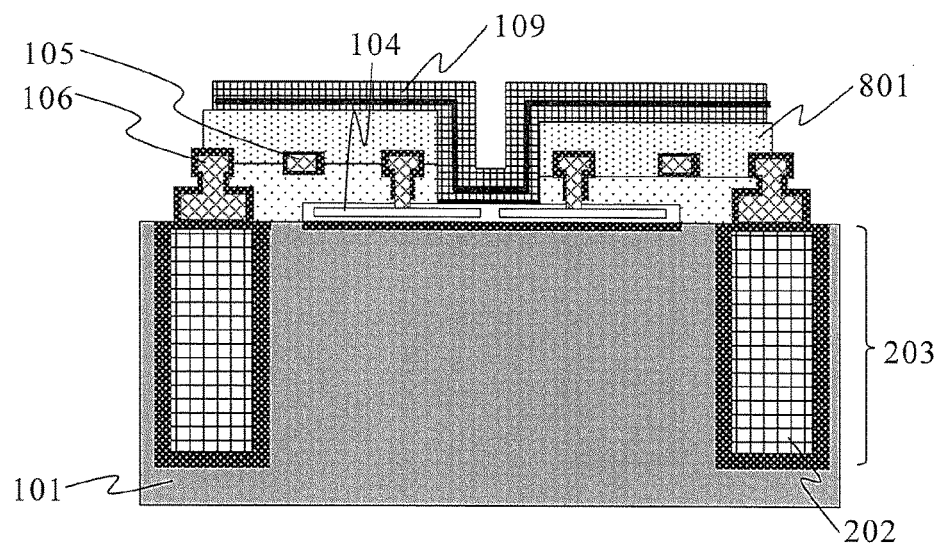
FIG. 35 is a view showing one of the sequence of processes for manufacturing the thermal infrared detector according to the seventh embodiment of this invention.
Figure 36:
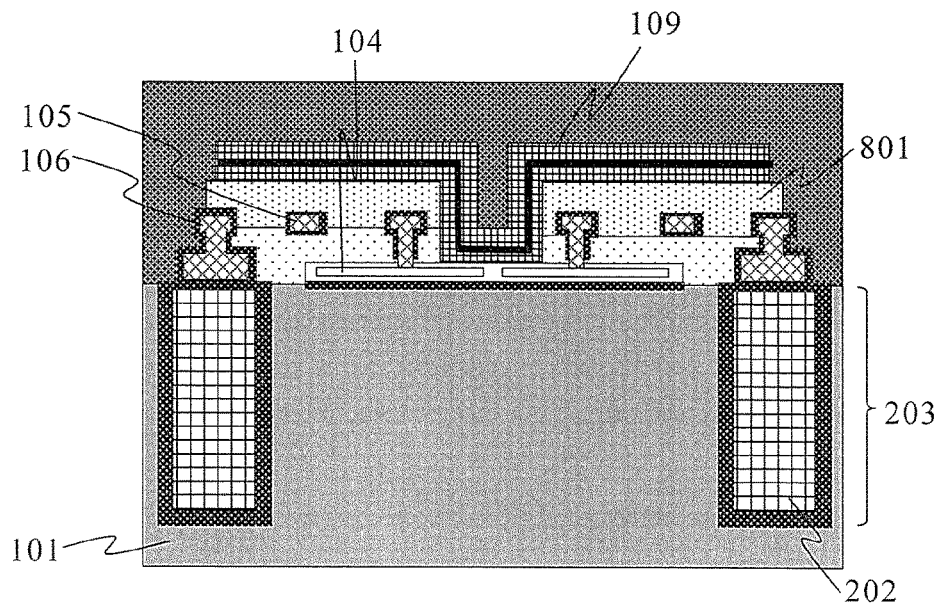
FIG. 36 is a view showing one of the sequence of processes for manufacturing the thermal infrared detector according to the seventh embodiment of this invention.
Figure 37:
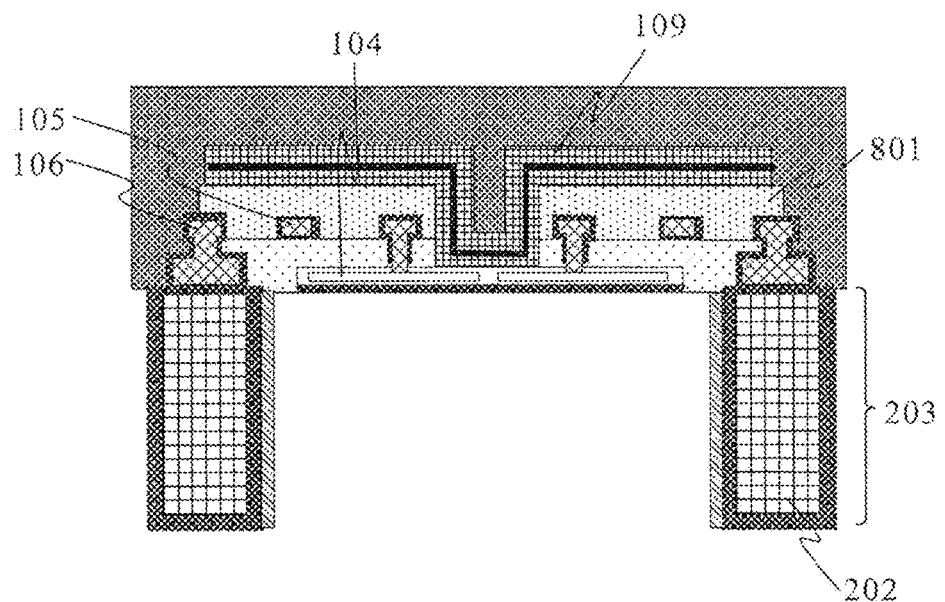
FIG. 37 is a view showing one of the sequence of processes for manufacturing the thermal infrared detector according to the seventh embodiment of this invention.

As shown in FIG. 34, following the process of FIG. 26, a second sacrificial layer 801 is formed. Note that an organic material such as polyimide may be used as the material of the second sacrificial layer 801. Next, the support opening portion 108 is formed by patterning.

Figure 38:
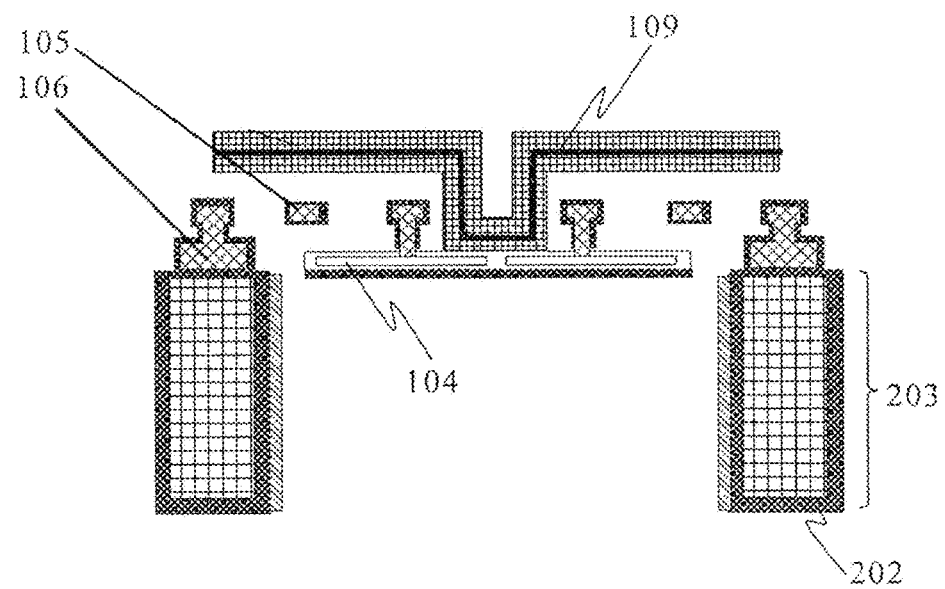
FIG. 38 is a view showing one of the sequence of processes for manufacturing the thermal infrared detector according to the seventh embodiment of this invention.

Thereafter, a back-illuminated thermal infrared detector shown in FIG. 38, which includes the infrared ray absorption structure 109, is completed by implementing similar processes to the first or second embodiment, as shown in FIGS. 35 to 38.

Needless to mention, with the back-illuminated thermal infrared detector according to the seventh embodiment, as described above, identical effects to the fifth embodiment are obtained. Furthermore, in the back-illuminated thermal infrared detector according to the seventh embodiment, infrared rays that pass through the sensor element can be absorbed by the infrared ray absorption structure, and therefore the sensitivity of the thermal infrared detector can be improved.

Eighth Embodiment

In an eighth embodiment of this invention, a back-illuminated thermal infrared detector including the infrared ray reflecting film 401 will be described.

Figure 39:
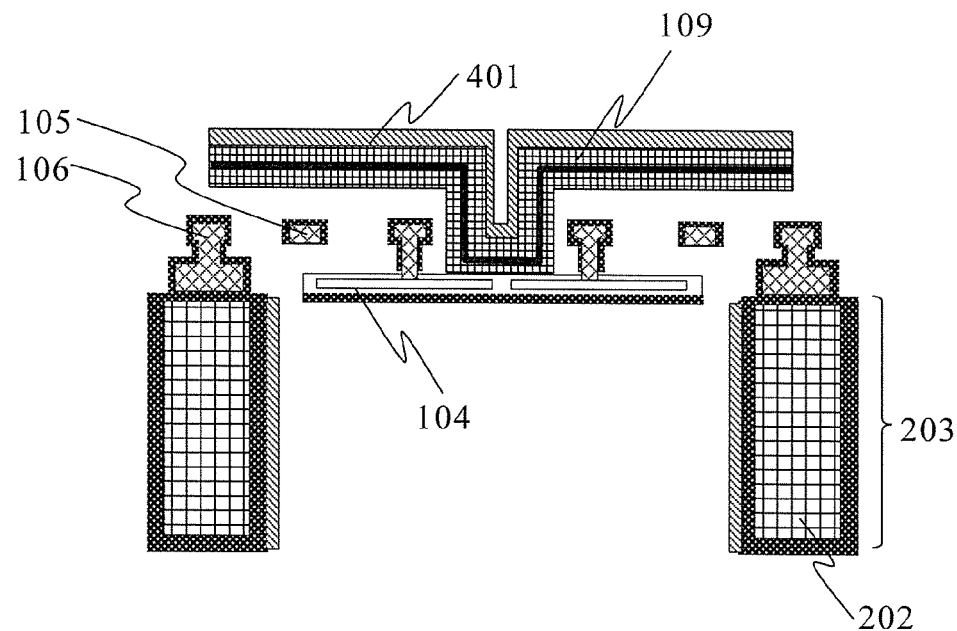
FIG. 39 is a view showing one of a sequence of processes for manufacturing a back-illuminated thermal infrared detector according to an eighth embodiment of this invention.

FIG. 39 is a view showing one of a sequence of processes for manufacturing the back-illuminated thermal infrared detector according to the eighth embodiment of this invention. In the back-illuminated thermal infrared detector shown in FIG. 39, the infrared ray reflecting film 401 is formed following the process of FIG. 35. Thereafter, the back-illuminated thermal infrared detector including the infrared ray reflecting film 401 is obtained by implementing similar processes to the seventh embodiment.

Needless to mention, with the back-illuminated thermal infrared detector according to the eighth embodiment, as described above, identical effects to the seventh embodiment are obtained. Furthermore, in the back-illuminated thermal infrared detector according to the eighth embodiment, infrared rays that pass through the sensor element and the infrared ray absorption structure can be reflected by the infrared ray reflecting film and reabsorbed by the sensor element and the infrared ray absorption structure. As a result, the sensitivity of the thermal infrared detector can be improved.

Note that at this time, an optical distance between the sensor element 104 and the infrared ray reflecting film 401 on the upper surface of the infrared ray absorption structure is preferably set at an odd number multiple of substantially one quarter of the wavelength of the detected infrared ray (in other words, when the wavelength of the detected infrared ray is $\lambda$, $\lambda/4+m\lambda/2$, where m=0, 1, 2, . . . ). In so doing, a resonance structure can be formed between the sensor element 104 and the infrared ray reflecting film 401 on the upper surface of the infrared ray absorption structure, enabling an improvement in the infrared ray absorption efficiency.

Ninth Embodiment

In a ninth embodiment of this invention, a back-illuminated thermal infrared detector that includes an infrared ray absorption structure having a curvature will be described.

Figure 40:
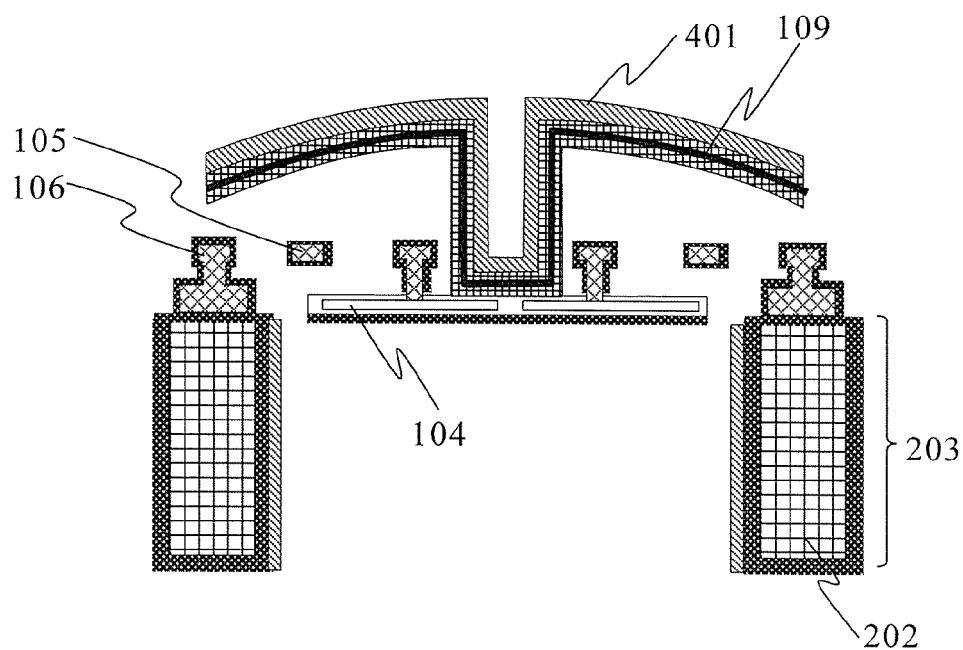
FIG. 40 is a view showing one of a sequence of processes for manufacturing a back-illuminated thermal infrared detector according to a ninth embodiment of this invention.

FIG. 40 is a view showing one of a sequence of processes for manufacturing the back-illuminated thermal infrared detector according to the ninth embodiment of this invention. The back-illuminated thermal infrared detector shown in FIG. 40 is obtained by adjusting the tension of $SiO_2$ films or SiN films formed in the process of FIG. 35.

For example, by varying the conditions under which the $SiO_2$ films or SiN films are formed above and below the infrared ray absorbing film so that the $SiO_2$ films or SiN films have different tensions, and then etching the sacrificial layer, an infrared ray absorption structure having a curvature so as to cover the sensor element 104 substantially in a dome shape is obtained.

Alternatively, a desired shape can be obtained by employing an organic sacrificial layer as the second sacrificial layer 801 and performing baking processing thereon at a high temperature in order to provide a curvature in the sacrificial layer, and then forming the infrared ray absorption structure 109. Note that the method in which a tension difference is obtained between the $SiO_2$ films or SiN films and the method in which an organic sacrificial layer is employed may be implemented simultaneously.

Needless to mention, with the back-illuminated thermal infrared detector according to the ninth embodiment, as described above, identical effects to the eighth embodiment are obtained. Furthermore, in the back-illuminated thermal infrared detector according to the ninth embodiment, the infrared ray absorption structure is provided with a curvature, and therefore infrared reflection light that leaks out through a gap between the sensor element and the trench structure in the eighth embodiment can be received and absorbed by the sensor element. As a result, the sensitivity of the thermal infrared detector can be improved.

What is claimed is:

1. A thermal infrared detector comprising:
   a plurality of infrared ray absorption structures that are arranged in a matrix form having columns and rows;
   a substrate that surrounds the plurality of infrared ray absorption structures, and comprises two opposing side surfaces extending in a direction of the rows and at least one side surface that is perpendicular to the two opposing side surfaces and extends in a direction of the columns;
   a plurality of beam-shaped trench structures that are disposed between the columns of the plurality of infrared ray absorption structures, and extend in the direction of the rows to remain connected to the at least one side surface of the substrate even after a heat insulation hollowing processing, and support a pixel area;
   a plurality of sensor elements disposed below the plurality of infrared ray absorption structures, and comprising a 0-degree polarization detection sensor element, a 45-degree polarization detection sensor element, a 135-degree polarization detection sensor element, and a 90-degree polarization detection sensor element that are bundled together, to form a plasmonic absorber between two adjacent beam-shaped trench structures among the plurality of beam-shaped trench structures;
   an etching hole through which the plurality of sensor elements is hollowed out and thereby thermally insulated is provided on a periphery of a pixel area,
   an opening portion is provided below the pixel area;
   a first infrared ray absorption structure of the plurality of infrared ray absorption structures that comprises
      a first column and a second column that are disposed in parallel with and spaced apart from each other, and perpendicular to a contact surface between the first infrared ray absorption structure and a first sensor element of the plurality of sensor elements, and
      a first arch and a second arch that are disposed on an upper portion of the first sensor element to absorb infrared rays passing through the first sensor element and are respectively connected to the first column and the second column to form a curvature that allows a vertical distance between the first sensor element and the first infrared ray absorption structure to gradually decease in a first horizontal direction from a junction of the first column and the first arch of the first infrared ray absorption structure towards an end of the first arch of the first infrared ray absorption structure, and in a second horizontal direction from a junction of the second column and the second arch of the first infrared ray absorption structure towards an end of the second arch of the first infrared ray absorption structure.

2. The thermal infrared detector according to claim 1, wherein the plurality of beam-shaped trench structures are provided directly below a wire for connecting the plurality of sensor elements to a peripheral circuit.

3. The thermal infrared detector according to claim 2, wherein a thermal conductivity material that has a higher thermal conductivity than an $SiO_2$ film is provided in the interior of the plurality of beam-shaped trench structures.

4. The thermal infrared detector according to claim 2, wherein the first sensor element comprises a front surface and a rear surface that oppose each other,
   the first infrared ray absorption structure is disposed on the front surface of the first sensor element, and the thermal infrared detector further comprises an infrared ray absorbing film provided on the rear surface of the first sensor element and disposed to directly oppose a contact area between the first infrared ray absorption structure and the front surface of the first sensor element.

5. The thermal infrared detector according to claim 2, comprising an infrared ray reflecting film provided on a side wall of each of the plurality of beam-shaped trench structures.

6. The thermal infrared detector according to claim 2, comprising:
   a heat insulation support leg formed on a separate plane that is different to a plane on which the first sensor element is formed; and
   an infrared ray reflecting film provided on a side wall of each of the plurality of beam-shaped trench structures.

7. The thermal infrared detector according to claim 1, wherein a thermal conductivity material that has a higher thermal conductivity than an $SiO_2$ film is provided in the interior of the plurality of beam-shaped trench structures.

8. The thermal infrared detector according to claim 7, wherein the first sensor element comprises a front surface and a rear surface that oppose each other,
   the first infrared ray absorption structure is disposed on the front surface of the first sensor element, and
   the thermal infrared detector further comprises an infrared ray absorbing film provided on the rear surface of the first sensor element and disposed to directly oppose a contact area between the first infrared ray absorption structure and the front surface of the first sensor element.

9. The thermal infrared detector according to claim 7, comprising an infrared ray reflecting film provided on a side wall of each of the plurality of beam-shaped trench structures.

10. The thermal infrared detector according to claim 7, comprising:
    a heat insulation support leg formed on a separate plane that is different to a plane on which the first sensor element is formed; and
    an infrared ray reflecting film provided on a side wall of each of the plurality of beam-shaped trench structures.

11. The thermal infrared detector according to claim 1, wherein the first sensor element comprises a front surface and a rear surface that oppose each other,
    the first infrared ray absorption structure is disposed on the front surface of the first sensor element, and the thermal infrared detector further comprises an infrared ray absorbing film provided on the rear surface of the first sensor element and disposed to directly oppose a contact area between the first infrared ray absorption structure and the front surface of the first sensor element.

12. The thermal infrared detector according to claim 1, comprising an infrared ray reflecting film provided on a side wall of each of the plurality of beam-shaped trench structures.

13. The thermal infrared detector according to claim 1, comprising:
- a heat insulation support leg formed on a separate plane that is different to a plane on which the first sensor element is formed; and
- an infrared ray reflecting film provided on a side wall of each of the plurality of beam-shaped trench structures.

14. The thermal infrared detector according to claim 13, further comprising a plasmonic absorber or an infrared ray absorbing film provided on a rear surface of the first sensor element.

15. The thermal infrared detector according to claim 1, wherein a detectable wavelength of the thermal infrared detector is in a range between 8 μm and 14 μm.

16. The thermal infrared detector according to claim 1, wherein two immediately adjacent sensor elements of the plurality of sensor elements which are arranged to be adjacent to each other in the direction of the columns, share one of the plurality of beam-shaped trench structures that is disposed between the two immediately adjacent sensor elements.

17. The thermal infrared detector according to claim 1, further comprising a first wire and a second wire that intersect each other and are disposed directly above the plurality of beam-shaped trench structures,
- wherein the 0-degree polarization detection sensor element, the 45-degree polarization detection sensor element, the 135-degree polarization detection sensor element, and the 90-degree polarization detection sensor element are disposed in four areas divided by the first wire and the second wire.

18. A manufacturing method for the thermal infrared detector according to claim 1, comprising a step of forming an insulating film and the plurality of beam-shaped trench structures directly below the plurality of sensor elements using a material having high etching selectivity relative to an Si substrate.

* * * * *